United States Patent
Hinkel et al.

(10) Patent No.: US 10,321,059 B2
(45) Date of Patent: Jun. 11, 2019

(54) PIXEL READOUT OF A CHARGE COUPLED DEVICE HAVING A VARIABLE APERTURE

(71) Applicant: Amazon Technologies, Inc., Seattle, WA (US)

(72) Inventors: Bradley Lawrence Hinkel, Kirkland, WA (US); William Nathan John Hurst, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/688,797

(22) Filed: Aug. 28, 2017

(65) Prior Publication Data

US 2018/0048820 A1 Feb. 15, 2018

Related U.S. Application Data

(63) Continuation of application No. 14/458,132, filed on Aug. 12, 2014, now Pat. No. 9,749,532.

(51) Int. Cl.
*G02B 5/00* (2006.01)
*G02B 13/20* (2006.01)
(Continued)

(52) U.S. Cl.
CPC ......... *H04N 5/23254* (2013.01); *G02B 5/005* (2013.01); *G02B 27/646* (2013.01); *H04N 5/2254* (2013.01); *H04N 5/23229* (2013.01); *H04N 5/3456* (2013.01); *H04N 5/35554* (2013.01); *H04N 5/35572* (2013.01); *G02B 13/20* (2013.01)

(58) Field of Classification Search
CPC ........... H04N 5/23254; H04N 5/35554; G02B 27/646
See application file for complete search history.

(56) References Cited

U.S. PATENT DOCUMENTS 6,856,355 B1   2/2005   Ray et al.
2002/0027600 A1   3/2002   Yamanaka et al.
(Continued)

FOREIGN PATENT DOCUMENTS

JP   10012524   1/1998

OTHER PUBLICATIONS

MathWorks, "Deblurring Images Using the Blind Deconvolution Algorithm—Matlab & Simulink Example," 1994-2015 The MathWorks, Inc., retrieved Apr. 9, 2014, from http://www.mathworks.com/help/images/examples/deblurring-images-using-the-blind-deconvolution-algorithm.html, 7 pages.
(Continued)

*Primary Examiner* — Jason A Flohre
(74) *Attorney, Agent, or Firm* — Davis Wright Tremaine LLP

(57) ABSTRACT

A system and method for obtaining, by an electronic device, a first set of image data recorded during an image capture event and a second set of image data recorded during an image capture event. During the image capture event, a characteristic of an image capture device is changed from a first state to a second state. The first and second sets of image data are recorded by an image capture device having one or more image recording components with one or more image sensor arrays. An image is generated based at least in part on the first and second sets of image data.

29 Claims, 18 Drawing Sheets

(51) Int. Cl.
*G02B 27/64* (2006.01)
*H04N 5/225* (2006.01)
*H04N 5/232* (2006.01)
*H04N 5/345* (2011.01)
*H04N 5/355* (2011.01)

(56) References Cited

U.S. PATENT DOCUMENTS

| | | |
|---|---|---|
| 2002/0159167 A1 | 10/2002 | Greenberg |
| 2003/0063529 A1 | 4/2003 | Iwata et al. |
| 2004/0201771 A1* | 10/2004 | Itoh ................. H04N 5/2352 348/363 |
| 2004/0263652 A1 | 12/2004 | Oda |
| 2005/0212940 A1 | 9/2005 | Kobayashi |
| 2008/0013941 A1 | 1/2008 | Daley |
| 2008/0029714 A1 | 2/2008 | Olsen et al. |
| 2008/0226844 A1 | 9/2008 | Shemo et al. |
| 2008/0239316 A1 | 10/2008 | Gharib et al. |
| 2008/0316354 A1 | 12/2008 | Nilehn et al. |
| 2009/0016642 A1 | 1/2009 | Hart |
| 2009/0219402 A1 | 9/2009 | Schneider |
| 2009/0225199 A1* | 9/2009 | Ferren ............... H04N 5/23212 348/240.99 |
| 2010/0128137 A1* | 5/2010 | Guidash ............. H04N 5/232 348/222.1 |
| 2010/0201865 A1 | 8/2010 | Han et al. |
| 2010/0245602 A1 | 9/2010 | Webster et al. |
| 2011/0085074 A1 | 4/2011 | Sonoda et al. |
| 2011/0122287 A1 | 5/2011 | Kunishige et al. |
| 2011/0128412 A1 | 6/2011 | Milnes et al. |
| 2011/0149129 A1 | 6/2011 | Kim et al. |
| 2012/0105690 A1 | 5/2012 | Waqas et al. |
| 2012/0200673 A1* | 8/2012 | Tagawa ............. H04N 5/23212 348/46 |
| 2012/0236164 A1 | 9/2012 | Nakano |
| 2012/0249830 A1 | 10/2012 | Tsubaki |
| 2012/0274775 A1 | 11/2012 | Reiffel |
| 2012/0300115 A1* | 11/2012 | Okada ............... H04N 5/23212 348/348 |
| 2013/0038767 A1 | 2/2013 | Kawamura et al. |
| 2013/0057714 A1 | 3/2013 | Ishii et al. |
| 2013/0222633 A1 | 8/2013 | Knight et al. |
| 2013/0266210 A1 | 10/2013 | Morgan-Mar et al. |
| 2013/0272625 A1 | 10/2013 | Cheng |
| 2014/0022359 A1 | 1/2014 | Misawa et al. |
| 2014/0063234 A1 | 3/2014 | Nobayashi |
| 2014/0139705 A1 | 5/2014 | Ebe |
| 2014/0176780 A1 | 6/2014 | Koshiba |
| 2014/0218550 A1 | 8/2014 | Chuang et al. |
| 2014/0247981 A1 | 9/2014 | Kusaka et al. |
| 2015/0015771 A1* | 1/2015 | Shih .................. H04N 5/23212 348/349 |
| 2015/0043783 A1 | 2/2015 | Ishihara |
| 2015/0104074 A1 | 4/2015 | Vondran et al. |
| 2015/0117496 A1 | 4/2015 | Johansson |
| 2015/0138379 A1 | 5/2015 | Auberger et al. |
| 2015/0170400 A1 | 6/2015 | Seitz et al. |
| 2015/0281592 A1* | 10/2015 | Sarkar ............... H04N 5/23232 348/239 |
| 2016/0277659 A1* | 9/2016 | Kim .................. H04N 5/23212 |

OTHER PUBLICATIONS

Josh et al., "Image Deblurring using Inertial Measurement Sensors," ACM SIGGRAPH Conference Proceedings, Jul. 2010, 8 pages.
Har-Noy et al., "LCD motion blur reduction: a signal processing approach," IEEE Transactions on Image Processing, National Center for Biotechnology Information, Feb. 2008, 17(2), 1 page.
Akoi et al., "Measurement and Description Method for Image Stabiliziation Performance of Digital Cameras," Proceedings of SPIE vol. 8659 of Sensors, Cameras, and Systems for Industrial and Scientific Applications XIV, Feb. 19, 2013, 14 pages.
U.S. Appl. No. 14/458,118, filed Aug. 12, 2014.
U.S. Appl. No. 14/458,107, filed Aug. 12, 2014.

* cited by examiner

PIXEL READOUT OF A CHARGE COUPLED DEVICE HAVING A VARIABLE APERTURE

CROSS REFERENCE TO RELATED APPLICATIONS

This application claims priority to and is a continuation of U.S. patent application Ser. No. 14/458,132, filed on Aug. 12, 2014, and is incorporated by reference for all purposes. This application also incorporates by reference for all purposes the full disclosure of co-pending U.S. patent application Ser. No. 14/458,107, filed concurrently herewith, entitled "MULTIPLE CAPTURES WITH A VARIABLE APERTURE."

BACKGROUND

Modern cameras create an image during a period of exposure when the camera shutter is open to permit light to enter through the lens. However, motion of the camera or motion of objects within the scene during the exposure period may result in images with undesirable blurring. Motion blur may be caused by any combination of directions and rotations of the camera and/or objects within the scene during the exposure, and the blurring within the scene may vary depending on the distance from the center of the frame. Because modern cameras generally provide a roughly constant aperture, not only is the motion during the exposure often indeterminate but the details of the motion cannot be easily extracted from the resulting image. Mitigating motion blur is made more difficult thereby without information about the directions of motion and velocities of the objects in motion within the scene.

BRIEF DESCRIPTION OF THE DRAWINGS

Various embodiments in accordance with the present disclosure will be described with reference to the drawings, in which.

DETAILED DESCRIPTION

Figure 1:
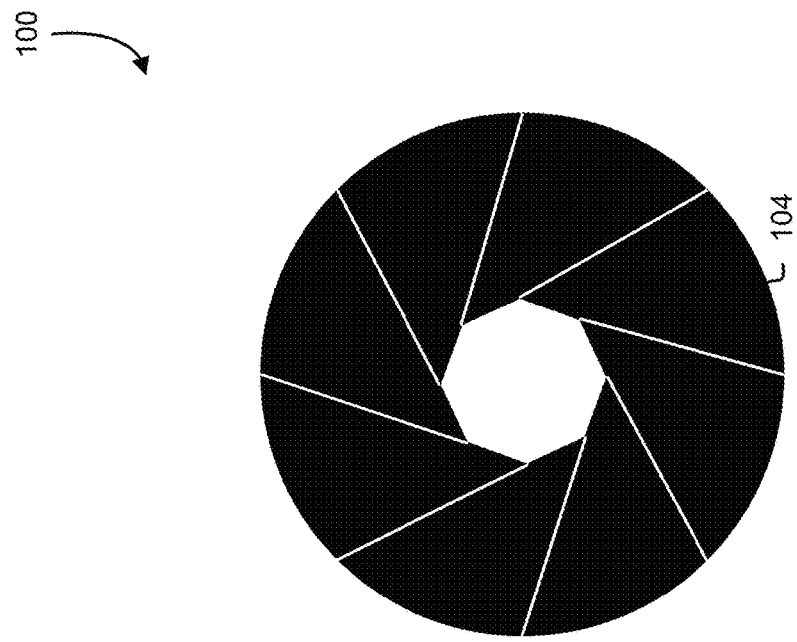
FIG. 1 illustrates operations of a typical aperture.
Figure 1:
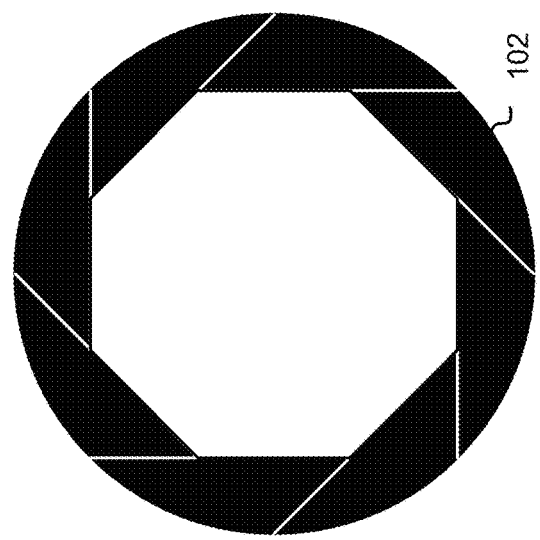

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include changing an aperture of an image capture charge-coupled device during an image capture exposure in order to determine information about the captured scene, such as objects in motion and directions of motion in the scene, by analyzing how the changing aperture affects the information recorded about the captured scene. Techniques described and suggested further include changing a distance of a focal plane of an image capture charge-coupled device during an image capture exposure in order to determine information from the captured scene, such as a depth map, by analyzing how the captured image was affected by the changing focal plane distance. Techniques described and suggested further include capturing images of a scene at different exposure times with an image capture charge-coupled device in order to determine information about the captured scene by analyzing how the captured image was affected by the different exposure times. The information gathered using the techniques described may be used for improving image quality of an image (e.g., deblurring/deconvolution processing).

The present disclosure improves the field of photography (e.g., the art, science and practice of creating durable images by recording light) by improving clarity in photographs captured by an image capture device, such as a camera. Clarity in images is improved by obtaining additional information about a scene, such as the information about movement of the camera during the image capture event (e.g., caused by camera shake etc.), information about objects in motion within the scene at the time of the exposure, depth information about objects within the scene at the time of the exposure, and information about details in high intensity (i.e., bright areas) and areas in shadow. Some of this information may be obtained by changing a shape of aperture during the exposure, scanning for the occurrence of bokeh artifacts in the captured image corresponding to the shape of the aperture before the change and corresponding to the shape of the aperture after the change. When using a charge-coupled image capture device, parts of the captured image may be extracted at different times during the exposure; for example, in a charge-coupled device having arrays of N rows (with N being a positive integer), data collected by even-numbered rows of the charge-coupled device may be retrieved at a first stage in the exposure when the aperture is in a first shape, and, at a later stage when the aperture is in a second shape, data collected by odd-numbered rows of the charge-coupled device may be received. Image data retrieved during the first stage may be compared with image data retrieved during the later stage to glean information about the scene for use in providing clarity to a final image. For example, by comparing bokeh artifacts occurring in the first stage image data with corresponding bokeh artifacts occurring in the later stage image data, data about the motion (e.g., speed and direction) of the camera and/or data about the motion (e.g., speed and direction) of objects in the scene may be determined.

Other information about the scene may be gathered by extracting parts of the captured image at different times during the exposure. For example, in a charge-coupled device having arrays N rows, data collected by even-numbered rows of the charge-coupled device may be retrieved at a first stage in the exposure, and, at a later stage data collected by odd-numbered rows of the charge-coupled device may be extracted. Then, image data retrieved during the first stage may be compared with image data retrieved during the later stage to glean information about the scene for use in providing clarity to a final image. For example, details in high light intensity (i.e., bright) areas of the scene may be identified based at least in part on the first stage image data, and details about the areas in shadow in the scene may be identified based at least in part on the later stage image data.

Furthermore, other information about the scene may be gathered by changing the focus of the camera during the exposure and extracting parts of the captured image at different times during the exposure. For example, in a charge-coupled device having arrays of N rows, data collected by even-numbered rows of the charge-coupled device may be retrieved at a first stage in the exposure when the focal point is at a first known depth, and, at a later stage when the focal point is at a different known depth, data collected by odd-numbered rows of the charge-coupled device may be extracted. Then, image data retrieved during the first stage may be compared with image data retrieved during the later stage to glean information about the scene for use in providing clarity to a final image. For example, a depth map of the scene may be created based at least in part on which objects in the scene are in focus during the different stages of the exposure.

FIG. 1 illustrates an example 100 of a typical operation of a shutter and an aperture. An aperture is an opening that permits light to reach an image recording component; that is, the aperture may be an opening through which light travels, positioned in front of or behind a lens or in front of a sensor. The size of the aperture may determine the sharpness of objects in an image that not at the focal plane of the image capture device. Light is permitted to pass through the aperture by a component before or after the lens or sensor, called a shutter. The example 100 depicts a wide aperture 102 and a narrow aperture 104. Apertures are often, but not always, controlled by a shutter, which may be comprised of one or more movable blades that may operate to increase or decrease the size of the aperture. The size of the aperture determines how close to parallel the light rays passing through the aperture will be. For example, the wide aperture 102 allows inbound light rays from more angles than the narrow aperture 104 to reach the image recording component. The result being that an image captured by an image capture device with the wide aperture 102 has sharp focus only for rays within a narrow range of focal length, whereas an image captured by an image capture device with the narrow aperture 104 has sharp focus at a wider range of focal length. However, because the aperture size determines how many rays actually reach the image recording component, to achieve the same level of intensity (i.e., brightness), an image capture event will need a longer exposure time when using the narrow aperture 104 than when using the wide aperture 102.

An image capture event, as used in the present disclosure, encompasses the activity that occurs from the moment that the image capture event is triggered, such as the press of a shutter button on an image capture device, until the image is recorded by an image recording component, at the end of the exposure. Examples of ways an image capture event may be triggered include, the press of a shutter or record button, pressing and holding a shutter or record button, setting an automatic timer, tapping a touch-screen button, programmatically starting the image capture event, and beginning the image capture event in response to a sensor, such as a motion detection sensor as may be present in a security or wildlife camera. The image capture event may be concluded when the exposure ends, such as by closing a shutter and/or reading out the last or all rows of a charge-coupled device image sensor array.

Characteristics of a camera aperture (aperture characteristics) include the shape (e.g., form) of the aperture and the size of the aperture. Camera apertures typically have a nearly round shape, however an aperture may be of nearly any shape. The shape of the aperture affects the shape of the blurring within the captured image, producing artifacts within the image in the shape of the aperture, referred to as bokeh artifacts. For example, bokeh artifacts produced in an image captured by an image capture device with a round aperture appear round, whereas bokeh artifacts produced in an image captured by an image capture device with an aperture in the shape of a cross will appear in the shape of a cross. By using an aperture of an identifiable shape, blurred regions may be identified by detecting occurrences of bokeh artifacts with the aperture shape within the captured image. When an object is otherwise within the focal area, occurrences of bokeh artifacts with the aperture shape at the object indicates that the object is in motion and blurring has occurred.

Thus, by changing the aperture in a particular manner during the exposure, the blur may be transformed into a predictable shape. The predictable shape may then be isolated and used to calculate the direction of motion and details of objects that were in motion during the exposure. Once the directions of motion and the objects that were in motion are known, the blur may be removed and the image sharpened thereby. For example, information about the motion, such as direction, velocity, and acceleration may be determined by first detecting occurrences of bokeh artifacts with the initial aperture shape within the captured image, changing the aperture of the image capture device during an exposure or between exposures, detecting occurrences of bokeh artifacts with the changed aperture shape within the same or subsequent captured image, and analyzing differences between the bokeh artifacts with the initial aperture shape and the bokeh artifacts with the changed aperture shape. Note that changing the aperture shape may include rotating the aperture or aperture shape, resulting in the same aperture shape but rotationally displaced; thus, the characteristic of rotation may be considered as a another characteristic of the camera aperture. Occurrences of the bokeh artifacts with the changed aperture shape should have corresponding occurrences of bokeh artifacts with the initial aperture shape from earlier in the exposure or an earlier exposure, and differences, such as a change in position, size, or intensity of the bokeh artifacts may provide information about the direction, velocity, and acceleration of the object and/or motion of the camera. However, by changing the aperture in a particular manner during the exposure, the blur may be transformed into a predictable shape. The predictable shape may then be isolated and used to calculate the direction of motion and details of objects that were in motion during the exposure. Once the directions of motion and the objects that were in motion are known, the blur may be removed and the image sharpened thereby.

The aperture may be changed in a variety of ways. In one example, during the same exposure or between exposures, an aperture may be at least partially rotated. In this example, it is preferable that the aperture shape not be round, as a circular shape looks the same at any degree of rotation, making it difficult to distinguish the bokeh artifacts with the initial aperture shape from the bokeh artifacts with the changed aperture shape. An advantage of rotating the aperture shape is that the area of the aperture is remains constant and allows the same amount of light to pass through regardless of the amount of rotation. In another example, the aperture rotates during the exposure or between exposures until it has the same shape as the initial aperture shape. Examples of apertures rotating until they look the same as when they started include, but are not limited to, an aperture in the shape of a five-pointed star that rotates 72 degrees, an aperture in the shape of an equal cross that rotates 90 degrees, an aperture in the shape of an isosceles triangle that rotates 120 degrees, an aperture in the shape of the letter "S" that rotates 180 degrees, an aperture in the shape of the letter "L" that rotates 360 degrees. An advantage to rotating the aperture shape until it has the same shape as the initial aperture shape may be that, because the area covered by the shape during the rotation is circular if the rotation begins and ends within the same exposure period, the bokeh artifacts on stationary out-of-focus objects will appear circular and more natural to the eye, whereas the bokeh artifacts caused by motion blur may not be circular and by therefore be more easily distinguished from the out-of-focus blurred objects. An advantage to using a distinguishable aperture shape that achieves the appearance of the initial aperture shape with fewer degrees of rotation includes that the rotation may be performed more quickly during the exposure period.

In another embodiment usable in combination with other embodiments, the aperture changes to a different shape during the exposure or between exposures. An example of an aperture that changes to a different shape includes, but is not limited to, an initial aperture shape that may be in the shape of a cross, but during the exposure or between exposures it may switch to be in the shape of a star. In yet another embodiment usable in combination with other embodiments, the aperture may change shape a plurality of times during the exposure or between exposures.

As another example, the aperture may change in size during the exposure or between exposures. Examples of the aperture changing size during the exposure include, but are not limited to, an aperture that grows larger during the exposure, an aperture that shrinks during the exposure, an aperture that grows and then shrinks during the exposure, or an aperture that quickly changes from one size to another. An advantage of an aperture changing in size may be that that a smaller aperture may have a greater depth of field than a larger aperture, and consequently more objects may appear in focus with the smaller aperture. Hence, by analyzing the occurrences of bokeh artifacts with the aperture shape as it changes in size during the exposure or between exposures, information about the depth of objects within the scene may be determined. The scene being visually perceptible information flowing from a physical environment to an image recording component of an image capture device.

As noted above, an aperture may be of any shape, however, the more distinctive the shape the easier it may be to detect occurrences of bokeh artifacts with the shape within a captured image. For example, an aperture having the shape of a cross may create cross-shaped bokeh artifacts in a captured image, which may be easier to detect than a round aperture that creates round bokeh artifacts in a captured image. In some instances, the initial aperture is round. In another embodiment usable in combination with other embodiments, the initial aperture is a shape that has greater than 1-fold rotational symmetry. In other instances, the initial aperture has rotational symmetry having greater than 2-fold rotational symmetry. Examples of initial apertures with rotational symmetry having an order greater than two includes, but is not limited to, an equilaterally triangular aperture, a square aperture, a cross-shaped aperture having arms of equal length and a star-polygon aperture having four or more points.

In some instances, the initial aperture has bilateral symmetry. Examples of initial apertures with bilateral symmetry include, but are not limited to an isosceles triangular-shaped aperture and a cross-shaped aperture having a first two arms of equal length and a second two arms of equal length but of a different length than the first two arms. In other instances, the initial aperture is asymmetric. An example of an asymmetric aperture includes, but is not limited to, an aperture in the shape of the letter "L."

Figure 2:
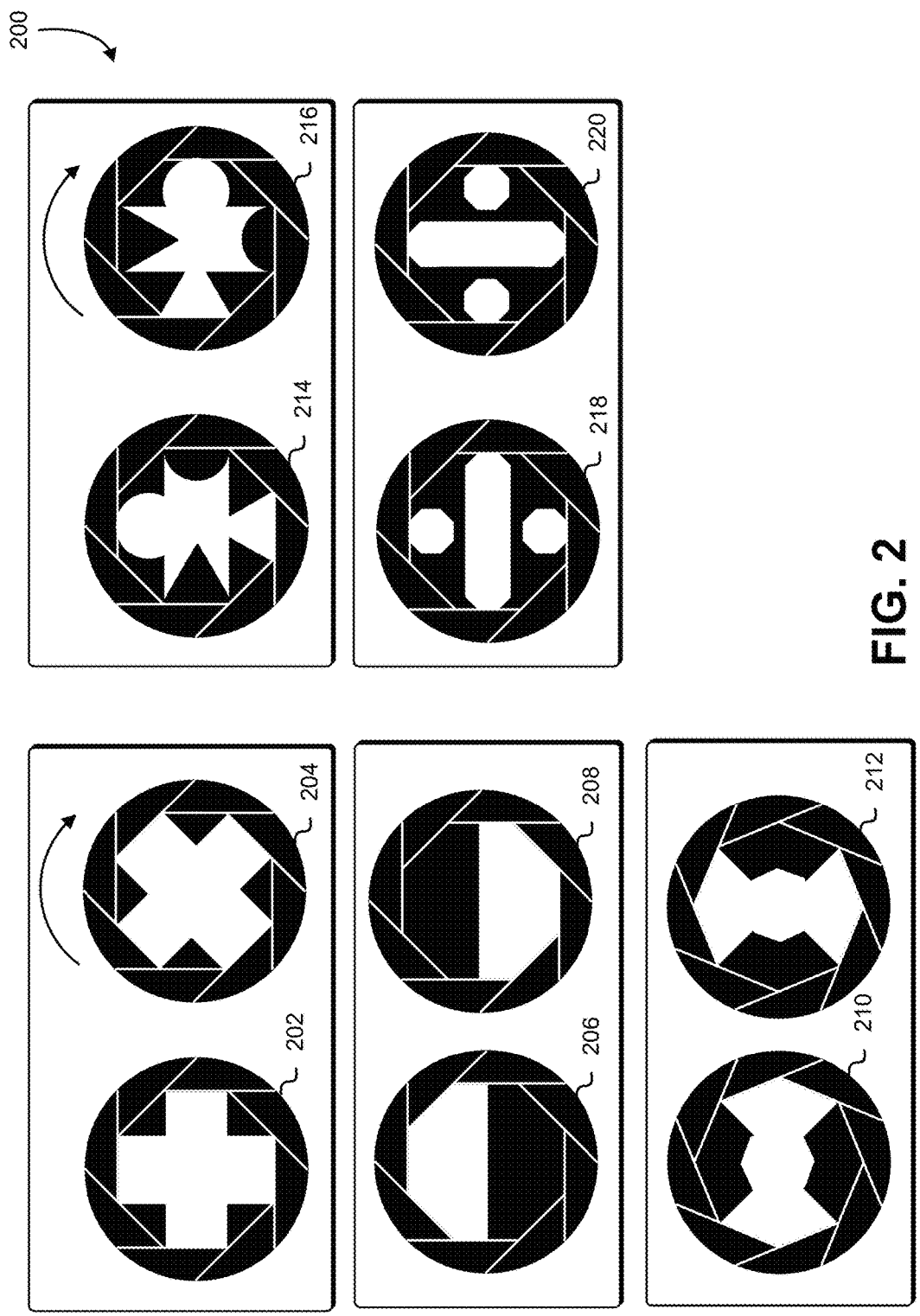
FIG. 2 illustrates a variety of aperture shapes in accordance with at least at least one embodiment.

FIG. 2 illustrates an example 200 of some of the various apertures which may be used in many of the embodiments of the present disclosure. In many embodiments of the present disclosure, the apertures are described as being able to change from one state (e.g., size, form, degree of rotation, etc.) to another, however other embodiments of the present disclosure may use a fixed aperture. Therefore, while the manner in which the aperture shapes FIG. 2 may be changed is described below, the same aperture shapes may not necessarily change in fixed aperture embodiments, and such fixed apertures may assume the aspect of any of the described states (e.g., sizes, forms, degree of rotations, etc.) described.

As illustrated in FIG. 2, the example 200 includes a cross-shaped aperture 202, which may be switched or rotated, as depicted by the rotated cross-shaped aperture 204. The cross-shaped aperture may be smoothly and/or continually rotated any number of degrees, or rapidly rotated or switched to any angle of rotation. The cross-shaped aperture 202 has $4^{th}$-order rotational symmetry; that is, when the cross-shaped aperture 202 is rotated 90 degrees, it has the same appearance as when it started. Example 200 also includes an illustration of an aperture 206 and an aperture 208 that is the inverse of aperture 206. The aperture 206 may be configured to alternate between a first state (i.e., 206) and a second (i.e., 208). The states may be alternated between the first alternating state and the second alternating state by mechanical method or an electrical method (e.g., LCD). In some instances, the first alternating aperture state 206 may transform to the second alternating aperture shape 208 through rotation rather than being mechanically or electrically switched.

Example 200 further includes an illustration of an aperture 210, also shown rotated by 90 degrees as aperture 212. Aperture 210 has $2^{nd}$-order rotational symmetry; that is, when the aperture 210 is rotated 180 degrees, it has the same appearance as when it started. In some instances, aperture 210 may be mechanically or electrically switched between aperture 210 and aperture 212 without rotation. Example 200 further includes an aperture 214, also shown rotated by 90 degrees as aperture 216. Aperture 214 has 1-fold symmetry (i.e., asymmetrical), and therefore must be rotated 360 degrees to achieve the same appearance as when it started.

Example 200 further includes an embodiment in which an aperture may have two or more openings. For example, aperture 218 is illustrated as having three openings, however an aperture of the present disclosure may comprise any number of openings. Aperture 220 illustrates a 90 degree rotation of the aperture 218.

Figure 3:
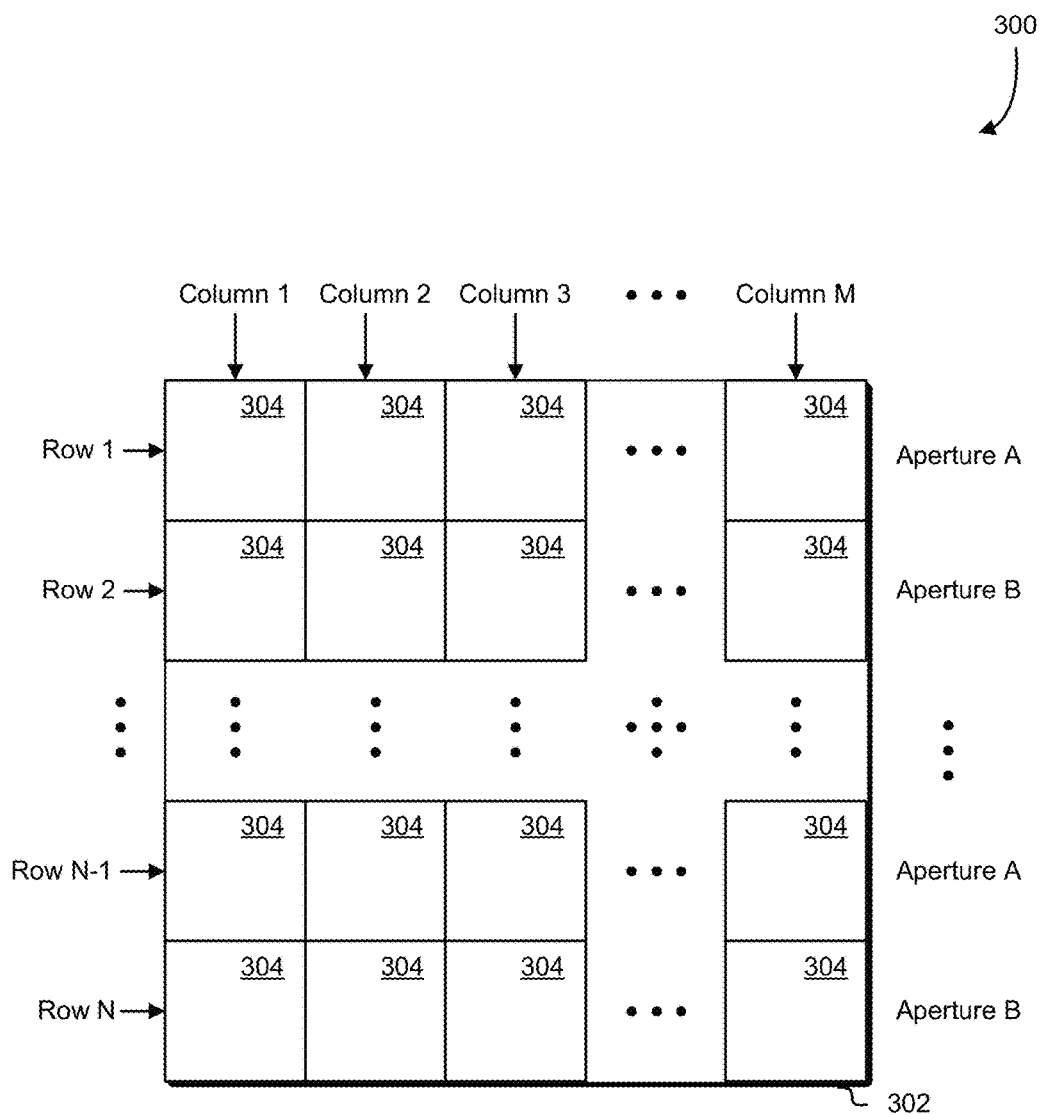
FIG. 3 illustrates an example of a charge-coupled device image sensor array in accordance with at least one embodiment.

FIG. 3 illustrates an example of a charge-coupled device 300 in which various embodiments of the present disclosure may be practiced. Specifically, FIG. 3 depicts an example charge-coupled device image sensor 302 having an M×N pixel element array. The 302 may comprise arrays of pixel elements 304 (e.g., photoactive capacitors) that accumulate electric charges proportional to an intensity of light falling on the respective pixel elements 304. During an image capture process, light passing through an aperture strikes one or more pixel elements 304, generating a small electrical charge held at the one or more pixel elements 304. The longer the exposure time, the more light strikes the pixel elements 304 thereby generating greater the charges at the pixel elements 304. When the exposure ends, such as by the closing of a mechanical or electronic shutter, the pixel elements 304 of the charge-coupled device image sensor 302 may be read from the array row by row. Each row may be read by each pixel element transferring its charge to its neighbor to the right (or left), similar to the operation of a shift register. As the charges exit the pixel element array, they may be converted to a voltage, digitized, stored in a memory, and an image may be constructed from the digitized values of each pixel element 304; the higher the charge, the greater the light intensity level (i.e., brightness) of the pixel in the image. Note that although the example depicted in the environment 3 appears monochromatic, to achieve color separation, the pixel elements 304 may be further segmented, such as according to a Beyer filter pattern, layered, such as in a Foveon scheme, or may be multiple discrete color-separated image sensors.

As described above, rows of the charge-coupled device may be read in any order, however, by extracting the rows of a charge-coupled device image sensor array out of sequence, it may be possible to obtain additional information about the scene. For example, during an image capture event, there may be a first portion of an exposure and a second portion of the exposure in a time domain. During the first portion of an exposure, when for example, an aperture may be in a particular state A, the odd-numbered rows of the charge-coupled device 302 array may be read, then at some point after the aperture changes to a particular state B, the even-numbered rows of the charge-coupled device 302 array may be read out. From such image data, two images of M×(N/2) pixels may be constructed, each representing a different period during the exposure. The two sets of image data may be compared with each other, and differences between the image data may provide information about the scene useful for performing deconvolution processing or other image processing functions. In some embodiments, the charge-coupled device 302 may be configured to allow pixel elements 304 to be read out in columns. Rows and/or columns may be read in alternating third rows, fourth rows, and so on, instead of in an even/odd pattern, depending on various factors, such as number of determined periods of the exposure or number of apertures, or may be read in a random pattern of rows. The charge-coupled device 302 may be configured to allow pixel elements 304 to be read out individually, such as in a checkerboard or other pattern, or may be read according to some random/stochastic scheme.

Figure 4:
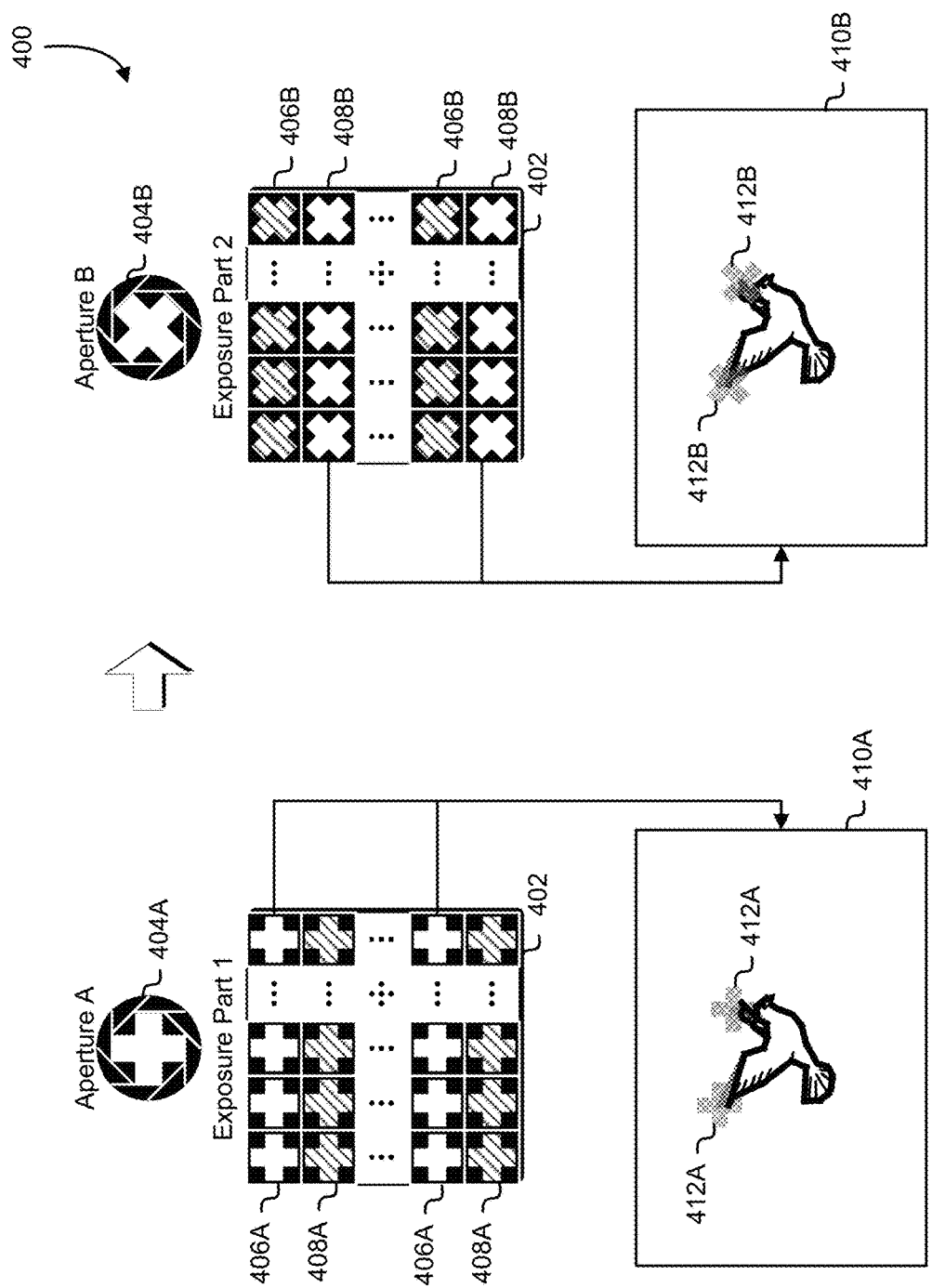
FIG. 4 illustrates an example of an image capture event with a changing aperture in accordance with at least one embodiment.

FIG. 4 illustrates an example 400 of motion blur captured by an embodiment of the present disclosure. As illustrated in FIG. 4, the example 400 depicts an image capture event using an image capture device with a charge-coupled device image sensor 402 having an array of pixel elements 406A-06B and 408A-08B in which, during a first part of the exposure, the aperture of the image capture device is in a first recognizable shape 404A (e.g., "Aperture A") and during the second part of the exposure, the aperture of the image capture device is in a second recognizable shape 404B (e.g., "Aperture B"), each part of the exposure yielding respective sets of image data 410A and 410B. As used in this disclosure, the parts of the exposure refer to a time duration during which the image recording components of the image capture devices of the present disclosure are exposed to light from the scene being captured.

During an image capture event, such as that depicted in the example 400, during a first portion of an exposure, an aperture may be in a first recognizable shape 404A. At the end of the first part of the exposure, alternating rows of the charge-coupled device image sensor 402, such as odd-numbered rows 406A, may be read out to gather the first set of image data 410A. During the first part of the exposure, the unread rows of the charge-coupled device sensor 402 pixel array, such as even-numbered rows 408A, may still be collecting data from light falling on the pixel elements of the unread rows. In some cases, these unread rows may be disabled during the first part of the exposure.

Note that the first recognizable shape 404A is displayed on the individual pixel elements of the charge-coupled device sensor 402 for illustration purposes only to represent light passing through the aperture of the first recognizable shape 404A falling on the individual pixel element of charge-coupled device sensor 402, and is not meant to imply that each individual pixel element of charge-coupled device sensor 402 has its own aperture in the first recognizable shape 404A. However, in some embodiment, the individual pixel elements of the charge-coupled device 402 may have their own apertures in the first recognizable shape 404A, such as may be in an implementation of liquid crystal electronic apertures.

The first set of image data 410A may include bokeh effects 412A representing motion blur caused by motion of the camera or motion of objects within the scene in the image data during the first part of the exposure. Similarly, during a second portion of an exposure of image capture event the aperture may be in a second recognizable shape 404B, and, at the end of the second part of the exposure, alternating rows of the charge-coupled device image sensor 402, such as even-numbered rows 408B may be read out to gather the second set of image data 410B. During the second part of the exposure, the unread rows of the charge-coupled device sensor 402 pixel array, such as odd-numbered rows 406B, may still be collecting data from light falling on the pixel elements of the unread rows. In some cases, these unread rows may be disabled during this second part of the exposure.

Note again that the second recognizable shape 404B is displayed on the individual pixel elements of the charge-coupled device sensor 402 for illustration purposes only to represent light passing through the aperture of the first recognizable shape 404B falling on the individual pixel element of charge-coupled device sensor 402, and is not meant to imply that each individual pixel element of charge-coupled device sensor 402 has its own aperture in the second recognizable shape 404B. However, in some embodiment, the individual pixel elements of the charge-coupled device 402 may have their own apertures in the second recognizable shape 404B, such as may be in an implementation of liquid crystal electronic apertures.

The second set of image data 410B may include bokeh effects 412B representing motion blur caused by motion of the camera or motion of objects within the scene in the image data during the second part of the exposure. Note that because the second recognizable shape 404B was different for when the second set of image data 410B was read, the second set of image data may be visibly distinguishable from the first set of image data, if rendered as images, at least in part based on the different appearances between the bokeh effects 412A and 412B caused by motion blur. The bokeh effects caused by motion blur, such as the bokeh effects 412A and 412B may be used to determine information usable to perform deblurring and other image clarifying processing, such as described in co-pending U.S. patent application Ser. No. 14/458,118, filed concurrently herewith, entitled "VARIABLE TEMPORAL APERTURE", which is incorporated by reference. For example, a bokeh article in the first set of image data 410A may represent motion of an object in the scene and correspond to a bokeh artifact in the second set of image data 410B, and the difference in the positions of bokeh artifacts relative to each other may provide information usable to calculate a motion vector indicating the direction and speed of pixels in the area of motion usable for deblurring/deconvolution processing. Note that while the example 400 depicts separate aperture shapes 404A and 404B, which, is some embodiment may be near-instantaneously switched, such as with the use of a liquid-crystal display aperture, in other embodiments the aperture may rotate in a smooth, continuous manner. In some embodiments, the aperture may undergo a full (i.e., 360-degree) rotation, whereas in other embodiment, the aperture shape may only be partially rotated. In some embodiments, the aperture may change in size.

Furthermore, the exposure may be apportioned into more than two parts. For example, there may be a first part of the exposure, a second part of the exposure, a third part of the exposure, a fourth part of the exposure, and so on, with each part of the exposure producing a respective first set of image data, second set of image data, third set of image data, fourth set of image data, and so on. In embodiments where the aperture changes between parts of the exposure, the aperture may alternate between a predetermined number of aperture shapes, such as a first apertures shape and a second aperture shape, or there may be a different aperture shape between sets or the aperture may be smoothly and continuously rotated during each part of the exposure. Likewise, in embodiments where the aperture changes size between parts of the exposure, the aperture may alternate between a predetermined number of aperture sizes, such as a first aperture size and a second aperture size, or there may be different aperture sizes for each part of the exposure or the aperture may smoothly and continuously increase or decrease in size during each part of the exposure. That is, the aperture may change according to a function that has continuous derivatives over the range of the change from a point at or after the start of the first exposure to a point at or before the end of the second exposure, or the aperture may change according to a function that has partial derivatives over multi-dimensional rates of change.

Note, for embodiments where unread rows are not disabled or cleared during portions of the exposure when they are unread, that in the example 400, even-numbered rows 408B may, in addition to the image data collected during the second part of the exposure, still retain data collected as even-numbered rows 408A during the first part of the exposure. In some embodiments, this image data may be processed to remove most of the data corresponding to the image data collected during the first part of the exposure. In other embodiments, the image data of rows 408A-08B may be useful in deconvolution processing; for example, because the image data would collected between the first part of the exposure and the second part of the exposure, the combined parts of the exposure may disclose more information about detail in shadowed areas than just from data collected during a single portion of the exposure alone. Likewise, in some embodiments, the odd-numbered rows 406B of pixel elements may still collect image data during the second part of the exposure, and this data may be combined with the even-numbered rows 408B and the odd-numbered rows from the first part of the exposure to create a full set of image data which may be processed according to information determined by comparing the first and second sets of image data. Note that, while images generated from image data collected from alternating rows or some other subset of rows may appear vertically flattened, such effects may be offset in a variety of ways, such as discarding alternating columns (or rows, in a case where the charge-coupled device supports column readout) or some other subset of columns, extrapolating the missing rows from rows above and below (or from columns on either side, an applicable), and extrapolating rows (or columns as applicable) from previously or subsequently-read rows (or columns).

Based on information determined by comparing the occurrences of identifiable aperture shapes within the captured image, further clarity may be achieved with deblurring algorithms. In at least one embodiment, the image capture device performs deconvolution processing on the captured image based on information determined by comparing the occurrences of bokeh artifacts with identifiable aperture shapes within the captured image. In another embodiment, the image capture device performs deconvolution processing on the captured image based on information received from motion detection integrated within the image capture device before performing deconvolution processing on the captured image based on information determined by comparing the occurrences of bokeh artifacts with identifiable aperture shapes within the captured image.

Blurring may occur within a captured image as focal blurring or motion blurring. Focal blurring occurs when light rays bouncing from an object do not converge in the image. If an aperture is wide, an image is sharp for objects that the lens is focusing on, but other objects are blurred; in other words, an object in a scene may appear blurry if the object is captured at a different distance of a focal point of the lens. Whereas, if an aperture is narrow (i.e., small) the image is sharper. The smaller the aperture, the less light enters through the aperture, so the shutter must be held open for a longer period to capture enough light for a proper exposure.

Blur occurs when an image capture device or an object moves during the exposure period. Motion blur may be caused by movement of the image capture device relative to an object during an image capture, which may be a linear and/or rotational motion with constant or variable velocity. Motion blur may further be caused by one or more objects in motion within the scene, such object motion may also be linear and/or rotational with constant or variable velocity with respect to the image capture device. Although blur may be desirable in some images for artistic purposes, blurring in other images may be undesirable. If unwanted blurring occurs within an image, deblurring processing may be performed on the image to attempt to reduce or eliminate blurring in the image.

Figure 5:
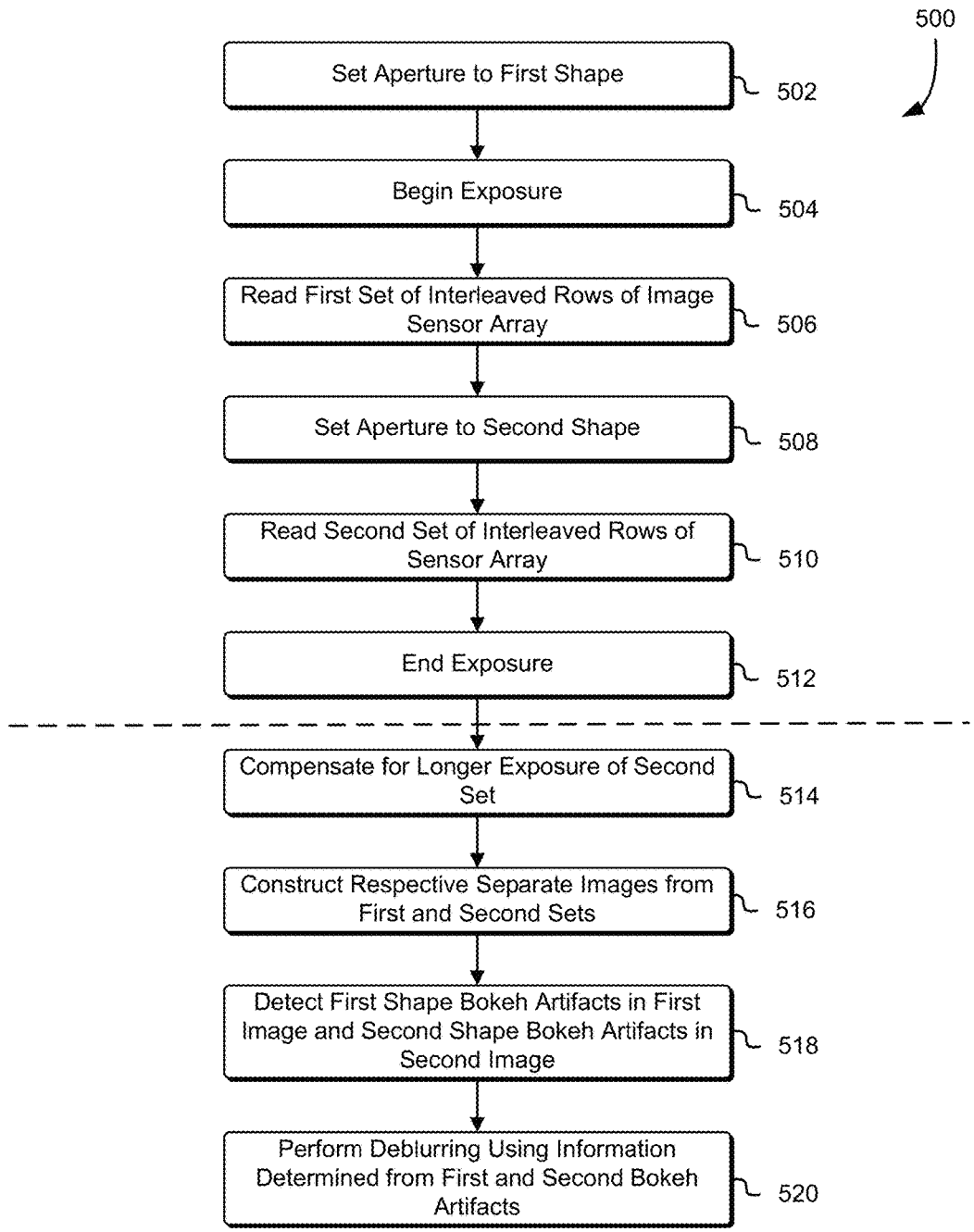
FIG. 5 is a block diagram that illustrates an example of an image capture event with a changing aperture in accordance with at least one embodiment.

FIG. 5 is a block diagram illustrating an example of a process 500 for using a charge-coupled device image capture device to use a changing aperture to gather information about a scene for use in deconvolution processing in accordance with various embodiments. The process 500 may be performed by any suitable image capture device, such as any type of consumer electronics device with image capture capability, including, but not limited to, still cameras and movie cameras that capture images from light. Furthermore, the image capture device may be configured with one or more applications that facilitate receiving voice inputs or voice commands from a user via the microphone or image inputs via a digital camera. In addition, the image capture device may also be equipped with one or more output peripherals such as a screen or speakers, such that if the image capture device is equipped with a touch screen, the touch screen may serve as both an input and an output peripheral device. The image capture device may further be equipped with a global positioning system (GPS) circuitry that enables locating the device, and may further be configured to embed location information into metadata of the captured image. The image capture device may further be equipped with an operating system and may be configured to execute software applications and programs compatible with the operating systems.

The process 500 includes a series of operations in which an a first set of image data is obtained from data captured during a first part of an exposure, then, after a shape of an aperture is changed, a second set of image data is obtained from data captured during a second part of the exposure, and deconvolution processing is performed based at least in part on information garnered from the first and second sets of image data. In 502, an aperture of a charge-coupled device image capture device may be configured to be a distinguishable shape. As noted, the distinguishable shape may be any shape, including, but not limited to, any of the aperture shapes disclosed regarding FIG. 2. Note that the operations of process 500 may be performed alone or in conjunction with either or both of the operations of process 700 of FIG. 7 and the operations of process 1100 of FIG. 11.

In 504, an image capture exposure begins, which may involve opening a shutter of the image capture device to allow light to enter the aperture configured in 502 to reach an image recording component. Examples of a shutter include, but are not limited to, a mechanical shutter with one or more movable blades and an electronic shutter, such as a liquid-crystal display. It is noted that the image capture device may not necessarily have a shutter, the exposure period may begin with an operation analogous to opening a shutter, including, but not limited to, enabling power to an image recording component. It is further noted that 502 may occur in concurrence with or at any time before 504.

In 506, a first set of rows of the charge-coupled device sensor array of the image capture device is read at the end of a first part of an exposure period. The charge-coupled device sensor array (e.g., having rows and columns) may be a two-dimensional array of pixel elements. Reading a row of the sensor array may include performing one or more shift-left or shift-right operation and reading the charge values of the individual pixel elements of the row. Likewise, reading a column of the sensor array may include performing one or more shift-up or shift-down operations. Note that shift operations may overwrite/clear the pixel elements of that row/column, however it is contemplated as being within the scope of this disclosure that it some embodiments, values of pixel elements may be read without overwriting/clearing the pixels or that the values may be added back after readout. In some embodiments this may be performed every other row, in some embodiments this may be every third row, in some embodiments this may be every fourth row, and so on. In some embodiments, the rows to be read may be determined randomly. An advantage of reading rows randomly may be to minimize noise and/or mitigate shutter wave distortion caused by objects moving within the scene during the image capture event.

In 508, the aperture may be modified to be a different shape than the aperture configured in 502. In 510, a second set of rows of the charge-coupled device sensor array of the image capture device is read at the end of a second part of the exposure. In some embodiments, the second set of rows may be different than the first set of rows. As noted, the rows of the second set may be alternating every other row, every third row, every fourth row, and so on according to the particular embodiment, and in some embodiments the rows may be randomly determined. It is noted that some or all operations 506-10 may or may not be as repeated one or more times, according to the various embodiments disclosed. For example, there may be a reading of a third set of rows, a fourth set of rows, and so on according to the particular embodiment, and the sets of rows may correspond to a third aperture shape, a fourth aperture shape, and so on as dictated by the particular embodiment.

When the image capture period is over, in 512, the exposure period is brought to a conclusion. This may involve closing a shutter of the image capture device to prevent further light from reaching the recording component through the aperture. However, it is noted that the image capture device may not necessarily have a shutter, and, in such a case, 512 may instead include an operation analogous to closing a shutter, including, but not limited to, disabling power to an image recording component. The dashed line indicates that the operations after 512 may be performed by either the image capture device performing steps 502-12 or may be performed by one or more external devices, such as computer systems in a distributed computing system of a computing resource service provider. Furthermore, the operations of 514-20 may be performed immediately following 512, or at any time thereafter.

Because, in embodiments where the second set of rows is neither disabled during the first part of the exposure nor cleared before the beginning of the second part of the exposure, the second set of rows may have been collecting image data during both the first and second parts of the exposure. As noted, in some of these embodiments, processing may be performed on the second set of rows in 514 to account for the additional image data collection; for example, occurrences of a first aperture shape in a second set of image data garnered from the second set of rows may be filtered out of the second set of image data. However, in some embodiments it may be useful to leave the extra image data in the second set of data; for example, the additional data may be useful in discerning details in shadowed areas of the captured image. Therefore, in some embodiments, the operations of 514 may be omitted.

In 516, the image data is compiled from the respective first and second rows. Note that 516 may occur at various stages of the process 500, or may be occur as separate operations (i.e., compiling image data from the first set of rows may occur at a different stage than compiling data from the second set of rows). The operations of 516 may also be performed in parallel with other operations of the image capture process. For example, a first set of image data may be compiled in conjunction with reading the first set of rows of 506. Likewise a second set of image data may be compiled in conjunction with reading the second set of rows of 510. In some embodiments, the first and second sets of image data may be constructed into actual images, whereas in other embodiments, the first and second sets of image data may retained in memory or stored to a data store without being formatted as an image type.

In 518, the first set of image data may be analyzed for occurrences of bokeh artifacts in the shape of the first aperture shape. Likewise the second set of image data may be analyzed for occurrences of bokeh artifacts in the shape of the second aperture shape, in which the found occurrences of bokeh artifacts of the second shape correspond to found occurrences of the first shape. Differences between the corresponding bokeh artifacts of the first and second shapes, such as differences in position, size, color, intensity, etc., may be used to determine information about the scene, such as direction and speed of movement of the camera or objects within the scene.

In 520, deblurring/deconvolution processing may be performed using the information gathered in 518. Further details on how deblurring/deconvolution processing may be performed in 520 using the information gathered in 518 may be found in the description of FIG. 11 of co-pending U.S. patent application Ser. No. 14/458,118, filed concurrently herewith, entitled "VARIABLE TEMPORAL APERTURE", which, as noted is incorporated by reference.

Figure 6:
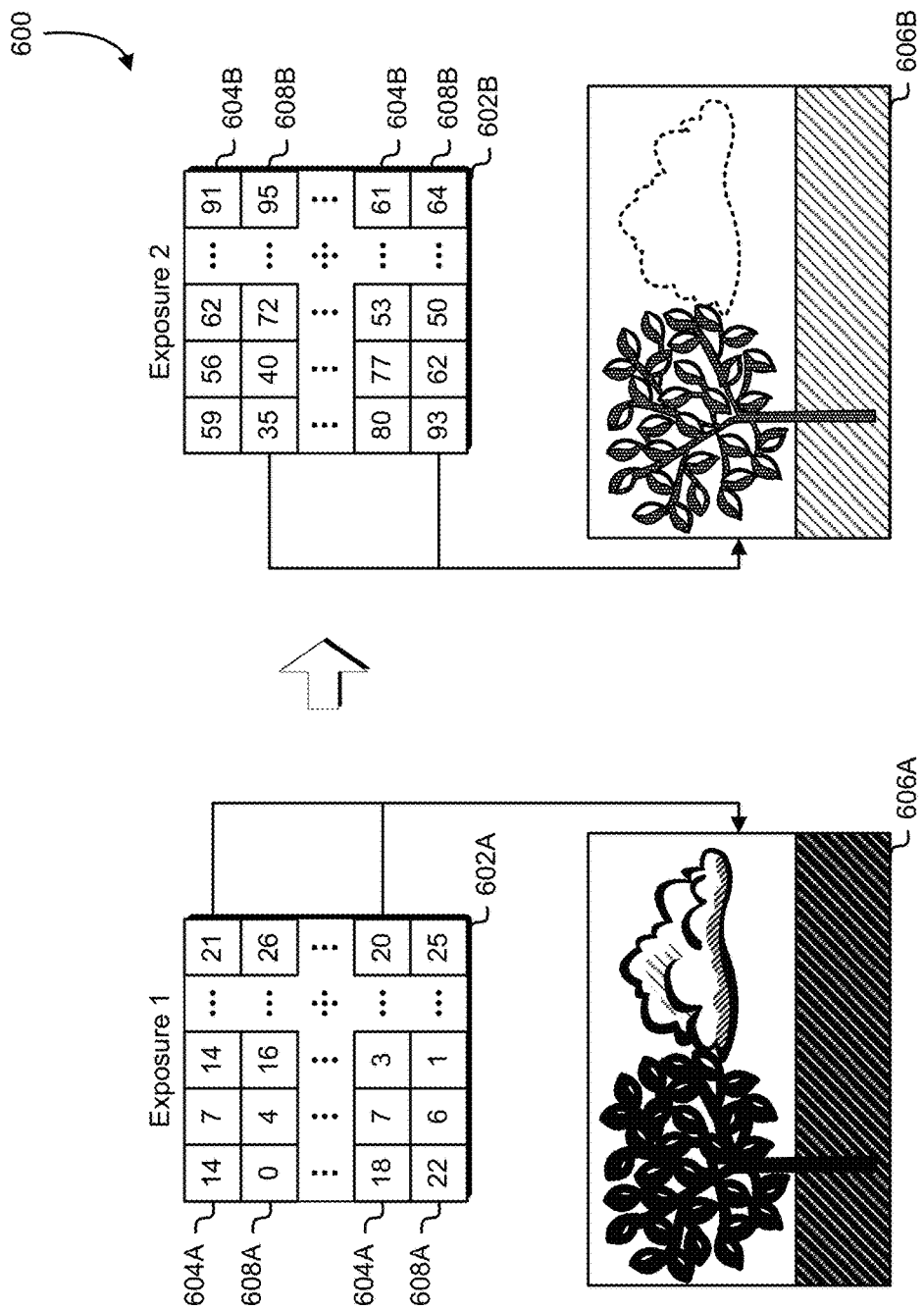
FIG. 6 illustrates an example of an image capture event with image data at different exposure times in accordance with at least one embodiment.

FIG. 6 illustrates an example 600 of image data captured at different points in an exposure according to an embodiment. Specifically, FIG. 6 depicts an example of retrieving portions of an image from a charge-coupled device image sensor 602A and 602B during different parts of the exposure during an image capture process. In the example 600, pixel element rows 604A may be read from the charge-coupled device sensor array 602A at the end of a first part of the exposure to yield a first set of image data 606A. The numbers displayed in the individual pixel element cells of the charge-coupled device image sensor 602A are indicative of electrical charges built up at the individual pixel elements due to photons (i.e., light) hitting the individual pixel elements of the charge-coupled device image sensor 602A during the first part of the exposure. During the first part of the exposure, pixel element rows 608A may still be collecting image data, but may not be read during or at the end of the first part of the exposure.

Note, that photons may have been striking the individual pixel elements of the charge-coupled device image sensor 602 for a relatively short period of time. As a result, the first set of image data 606A may appear darker than and visibly distinguishable from the second set of image data 606B, if rendered as images. An advantage presented by the first set of image data may be that details of objects exhibiting high light intensity (i.e., brighter-appearing objects), such as details of the cloud depicted in the first set of image data 606A, may be more readily discernable.

At the end of a second part of the exposure, pixel element rows 608B may be read out from the charge-coupled device 602B sensor array to yield a second set of image data 606B. In some embodiments, all rows, not just alternate rows 608B, may be read out at the end of the second part of the exposure. Note that the numbers in the individual pixel element cells of the charge-coupled device image 602B at the end of the second part of the exposure indicating the electrical charges built up at the individual pixel elements are larger than the corresponding numbers at the end of the first part of the exposure; these larger values indicate that photons have been striking the individual pixel elements during both parts of the exposure.

A result of photons striking the individual pixel elements for a longer period may be that the second set of image data 606B appears to have greater intensity than the first set of image data 606A. An advantage of photons striking the individual pixel elements for a longer period may be that details of dark and/or shadowed areas of the image, such as details of the tree depicted in the image data 606A and 606B, may be more readily discernable in the second set of image data 6B. However, details of high intensity (i.e., bright) areas in the second set of image data, such as the details of the cloud depicted in 606B, may be lost. However, by processing the first set of image data 606A collected during the first part of the exposure having details of high light intensity areas with the second set of image data 606B collected during the second part of the exposure having details of dark areas, a final image may be produced with greater dynamic range between both high and low intensity areas than an image captured using image data collected only at the end of an exposure.

Figure 7:
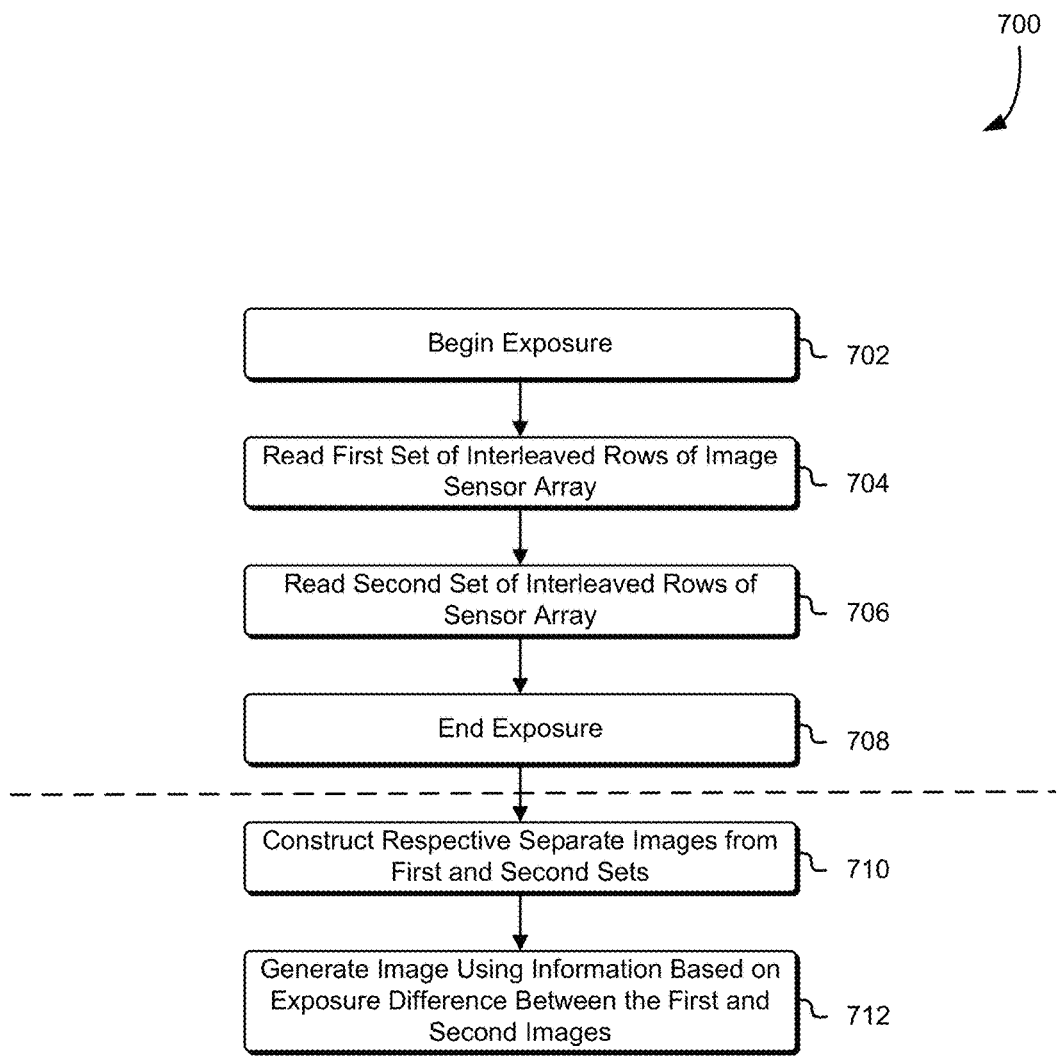
FIG. 7 is a block diagram that illustrates an example of an image capture event with image data at different exposure times in accordance with at least one embodiment.

FIG. 7 is a block diagram illustrating an example of a process 700 for reading image data in stages during portions of the exposure in accordance with various embodiments. The process 700 may be performed by any suitable image capture device, such as any of the image capture devices described in conjunction with FIG. 5. The process 700 includes a series of operations in which rows of pixel elements of a charge-coupled device image sensor are read out during different portions of an exposure of an image capture event. In 702, an image capture event is started, which may involve opening a shutter of an image capture device to allow light to enter the aperture to reach the image recording component (e.g., a charge-coupled device sensor array). Examples of a shutter include, but are not limited to, a mechanical shutter with one or more movable blades and an electronic shutter, such as a liquid-crystal display. It is noted that the image capture device may not necessarily have a shutter, the exposure period may begin with an operation analogous to opening a shutter, including, but not limited to, enabling power to an image recording component. Note that the operations of process 700 may be performed alone or in conjunction with either or both of the operations of process 500 of FIG. 5 and the operations of process 1100 of FIG. 11; for example, an aperture of the image capture device may be set to a first distinct aperture shape or a focus set to a first focal point at or before the beginning of the exposure period.

In 704, a first set of rows of the charge-coupled device sensor array of the image capture device is read after a first part of the exposure. As noted, the charge-coupled device sensor array may be a two-dimensional array of pixel elements. Reading a row of the sensor array may include performing one or more shift-left or shift-right operation and reading the charge values of the individual pixel elements of the row. Likewise, reading a column of the sensor array may include performing one or more shift-up or shift-down operations. Note that shift operations may overwrite/clear the pixel elements of that row/column, however it is contemplated as being within the scope of this disclosure that it some embodiments, values of pixel elements may be read without overwriting/clearing the pixels or that the values may be added back after readout. In some embodiments this may be performed every other row/column, in some embodiments this may be every third row/column, in some embodiments this may be every fourth row/column, and so on. In some embodiments, the rows/columns to be read may be determined randomly. In some embodiments, the first set may be all of the rows/columns of the charge-coupled device sensor array.

In 706, a second set of rows of the charge-coupled device sensor array of the image capture device may be read after a second part of the exposure. In some embodiments, the second set of rows may be different than the first set of rows, whereas in other embodiments the rows may be the same for the first set as for the second set. Note that when the operations of 700 are performed in conjunction with either or both the operations of 500 and/or 1100, setting of a second aperture shape and/or setting of a second focal point may occur at or before the operations of 706. As noted, the rows of the second set may be alternating every other row, every third row, every fourth row, and so on according to the particular embodiment, and in some embodiments the rows may be randomly determined. Note that the second part of the exposure of 706 occurs after the first part of the exposure of 704, meaning that the second set of rows actually has been accumulating information (e.g., due to photons received by the pixel elements) during the combined first and second exposure periods; thus, the second set of rows will have had a longer exposure than the first set of rows. It is noted that operations 704 and/or 706 may or may not be as repeated one or more times, according to the various embodiments disclosed. Furthermore, the parts of the exposure may vary in duration; for example, it may be that the total exposure period is $\frac{1}{10}^{th}$ of a second, but the first part of the exposure described above may only last for $\frac{1}{100}^{th}$ of a second.

When the image capture period is over, in 708, the exposure period is brought to a conclusion. This may involve closing a shutter of the image capture device to prevent further light from reaching the recording component through the aperture. However, it is noted that the image capture device may not necessarily have a shutter, and, in such a case, 708 may instead include an operation analogous to closing a shutter, including, but not limited to, disabling power to an image recording component. The dashed line indicates that the operations after 708 may be performed by either the image capture device performing steps 702-708 or may be performed by one or more external devices, such as computer systems in a distributed computing system of a computing resource service provider. Furthermore, the operations of 710-12 may be performed immediately following 708, or at any time thereafter.

As has been noted, in some embodiments, the second set of row may include all rows of the charge-coupled device sensor array or the same rows as the first set of rows, rather than a set of rows different than the first row or rather than interleaved or randomly-determined rows. In such a case where all rows of the charge-coupled device sensor array are read at the end of the second part of the exposure, the image data collected during the first part of the exposure may be used to identify details in high intensity areas of the image.

In 710, the image data is compiled from the respective first and second rows. Note that 710 may occur at various stages of the process 700, or may be occur as separate operations (i.e., compiling image data from the first set of rows may occur at a different stage than compiling data from the second set of rows). The operations of 710 may also be performed in parallel with other operations of the image capture process. For example, a first set of image data may be compiled in conjunction with reading the first set of rows of 704. Likewise a second set of image data may be compiled in conjunction with reading the second set of rows of 706. In some embodiments, the first and second sets of image data may be constructed into actual images, whereas in other embodiments, the first and second sets of image data may retained in memory or stored to a data store without being formatted as an image type. In 712, the first and second sets of image data may be processed to generate a final image combining data determined from the first set of rows and the second set of rows read during the exposure period. In some embodiments, the processing may include adding detail to high intensity (i.e., bright) areas of the image, as may be found in the second set of rows, with shadow detail from the first set of rows.

Figure 8:
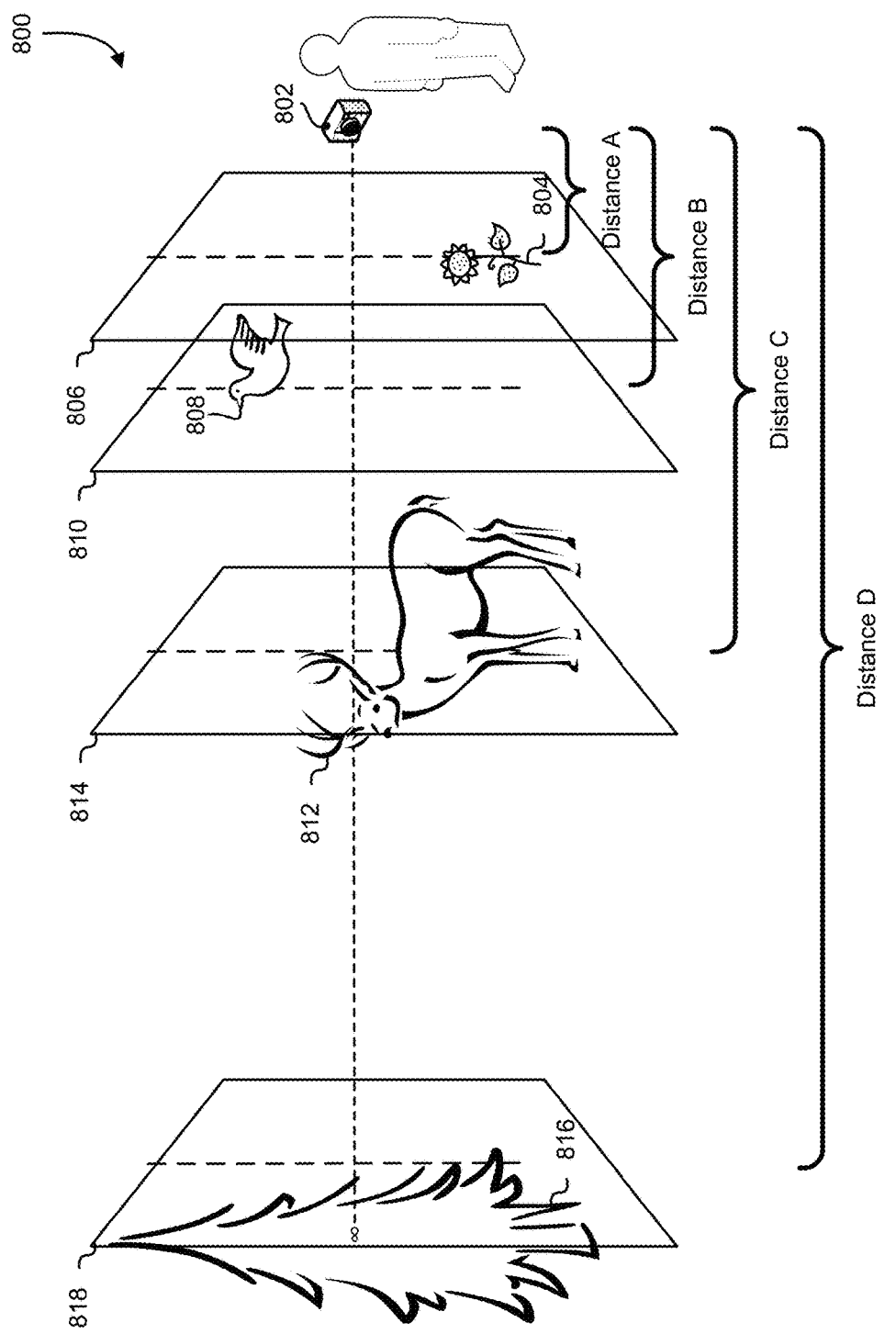
FIG. 8 illustrates an example of an image capture event with changing focal distances in accordance with at least one embodiment.

FIG. 8 illustrates an aspect of an example scene 800 in which various embodiments of the present disclosure may be practiced. As illustrated in FIG. 8, the scene 800 may include a person using an image capture device 802 capturing an image of a scene in which, during the image capture event, the focus may be changed a plurality of times during the exposure, thereby affecting the depth of field where objects are in focus during parts of the exposure period. The image capture device 802 may be any suitable image capture device, such as any of the image capture devices described in conjunction with FIG. 5, and the lens configuration and aperture size of the image capture device 802 may at least in part determine the focal point, and objects outside of the circle of confusion of the focal point may be blurry (i.e., not in focus).

Distance A in the example scene 800, represents a short distance to an object in the scene, such as flower 804 at a focal plane 806. During a first exposure period, the focal plane 806 may be the closest to the image capture device 802, such that the flower 804 is in focus. Distance B represents a distance approximately twice as far from the image capture device 802; at this distance, there may be another object in focus, such as bird 808 at a focal plane 810 at distance B. Likewise, distance C may have a focal plane 814 where another object of the scene, such as deer 812 may be in focus. Finally, at distance D, the focal plane 818 may be the farthest from the image capture device 802 with the focus effectively focusing to infinity, with objects in the distance, such as tree 816 being in suitable focus.

Figure 9:
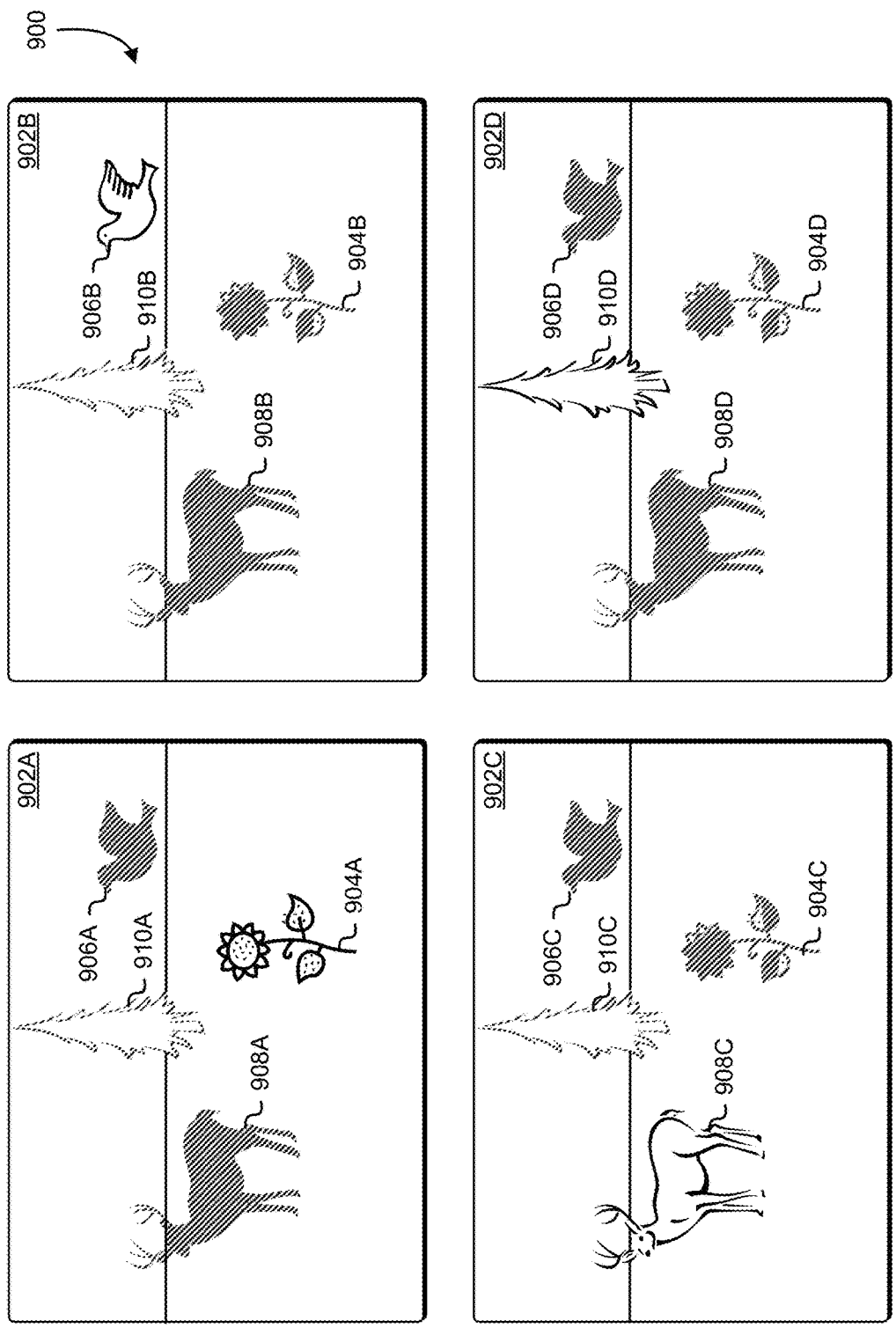
FIG. 9 illustrates an example of sets of image data captured during an image capture event with changing focal distances in accordance with at least one embodiment.

FIG. 9 illustrates example image data 900 captured at different focal distances according to an embodiment. Specifically, FIG. 9 depicts an example scene captured by reading charge-coupled device image sensor information from an image capture device of the present disclosure at four different periods during an exposure where the focal plane of the image capture device is changed for each period of the exposure. In the illustration, a first period during the exposure is represented by a first set of image data 902A, a second period during the exposure is represented by a second set of image data 902B, a third period during the exposure is represented by a third set of image data 902C, and a fourth period during the exposure is represented by a fourth set of image data 902D. It is noted that the four periods depicted are for illustration purposes only and that embodiments of more or less periods are also contemplated as being within the scope of this disclosure.

In the first set of image data 902A, the focal plane of the image capture device may be at its closest during the exposure, and consequently the closest object, flower 904A, may be the closest to the focal distance and have the best focus. Objects further away from the focal distance, such as objects 906A, 908A, and 910A, may be out-of-focus (i.e., blurry). The first set of image data may be obtained, for example, by reading every fourth row of a charge-coupled device image sensor, such as the charge-coupled device image sensor 302 described in conjunction with FIG. 3. Note that the determination of which pixel elements of the charge-coupled device image sensor to read may vary according to the particular embodiment. That is, in some embodiments, the determination may be made randomly, in some embodiments, the pixel elements may be read out in columns or in a checkerboard or other pattern, or may be read according to some random/stochastic scheme, and in some embodiments all pixel elements may be read.

In the second set of image data 902B, the focal plane may be farther than the focal plane during the capture of the first set of image data 902A, and consequently an object farther away than the closest object 904B may be the closest to the focal distance, such as bird 906B and thereby have the best focus. Objects further away from the focal distance, such as more distant objects 908B and 910B, as well as closer objects, such as object 904B, may be out-of-focus. The second set of image data may be obtained, for example, by reading every fourth row, offset by one from the rows read for obtaining the first set of image data. Note that the determination which pixel elements of the charge-coupled device image sensor to read may vary according to the particular embodiment. That is, in some embodiments, the determination may be made randomly, in some embodiments, the pixel elements may be read out in columns or in a checkerboard or other pattern, or may be read according to some random/stochastic scheme, and in some embodiments all pixel elements may be read. In some embodiments, the pixel elements read of the charge-coupled device image sensor array may be different pixel elements than those read when obtaining data for the first set of image data. However, in some embodiments some or all pixel elements read for obtaining the second set of image data may be ones that were also read when obtaining the first set of image data. Note also that in some embodiments, the rows read when obtaining the second set of image data may be cleared before beginning the second period of the exposure. In other embodiments, the rows of pixel elements read may comprise data collected from both the first and second periods of the exposure. In some of these embodiments, the rows read to obtain the second set of image data may include some or all rows read during when obtaining the first period of the exposure, and values obtained when reading the pixel elements during the first period of the exposure may be subtracted from values obtained by reading the pixel elements during the second period of the exposure to determine image data collected between the end of the first period of the exposure and the end of the second period of the exposure.

In the third set of image data 902C, the focal plane of the image capture device may be farther than the focal plane used during the capture of second set of image data 902B, and consequently an object farther away than the object 904C and 906C may be the closest to the focal distance, such as deer 908C and thereby have the best focus. Objects further away from the focal distance, such as more distant object 910C, as well as closer objects, such as object 904C and object 906C, may be out-of-focus. The third set of image data may be obtained, for example, by reading every fourth row, offset by two from the rows read for obtaining the first set of image data. Note that the determination which pixel elements of the charge-coupled device image sensor to read may vary according to the particular embodiment. That is, in some embodiments, the determination may be made randomly, in some embodiments, the pixel elements may be read out in columns or in a checkerboard or other pattern, and in some embodiments all pixel elements may be read. In some embodiments, the pixel elements read of the charge-coupled device image sensor array may be different pixel elements than those read when obtaining data for the first and second sets of image data. However, in some embodiments some or all pixel elements read for obtaining the third set of image data may be ones that were also read when obtaining the first and/or second set of image data. Note also that in some embodiments, the rows read when obtaining the third set of image data may be cleared before beginning the third period of the exposure. In other embodiments, the rows of pixel elements read may comprise data collected from both the second and third periods of the exposure. In some of these embodiments, the rows read to obtain the third set of image data may include some or all rows read during when obtaining the second period of the exposure, and values obtained when reading the pixel elements during the second period of the exposure may be subtracted from values obtained by reading the pixel elements during the third period of the exposure to determine image data collected between the end of the second period of the exposure and the end of the third period of the exposure.

In the fourth set of image data 902D, the focal plane of the image capture device may be at its farthest point in the exposure, and consequently the farthest objects in the scene, such as tree 910D may have the best focus. Closer objects, such as object 904D, object 906D, and object 908D may be out-of-focus. The fourth set of image data may be obtained, for example, by reading every fourth row, offset by three from the rows read for obtaining the first set of image data. Note that the determination which pixel elements of the charge-coupled device image sensor to read may vary according to the particular embodiment. That is, in some embodiments, the determination may be made randomly, in some embodiments, the pixel elements may be read out in columns or in a checkerboard or other pattern, or may be read according to some random/stochastic scheme, and in some embodiments all pixel elements may be read. In some embodiments, the pixel elements read of the charge-coupled device image sensor array may be different pixel elements than those read when obtaining data for the first and second sets of image data. However, in some embodiments some or all pixel elements read for obtaining the fourth set of image data may be ones that were also read when obtaining the first, second and/or third set of image data. Note also that in some embodiments, the rows read when obtaining the fourth set of image data may be cleared before beginning the fourth period of the exposure. In other embodiments, the rows of pixel elements read may comprise data collected from both the third and fourth periods of the exposure. In some of these embodiments, the rows read to obtain the fourth set of image data may include some or all rows read during when obtaining the third period of the exposure, and values obtained when reading the pixel elements during the third period of the exposure may be subtracted from the values obtained by reading the pixel elements during the fourth period of the exposure to determine image data collected between the end of the third period of the exposure and the end of the fourth period of the exposure.

Figure 10:
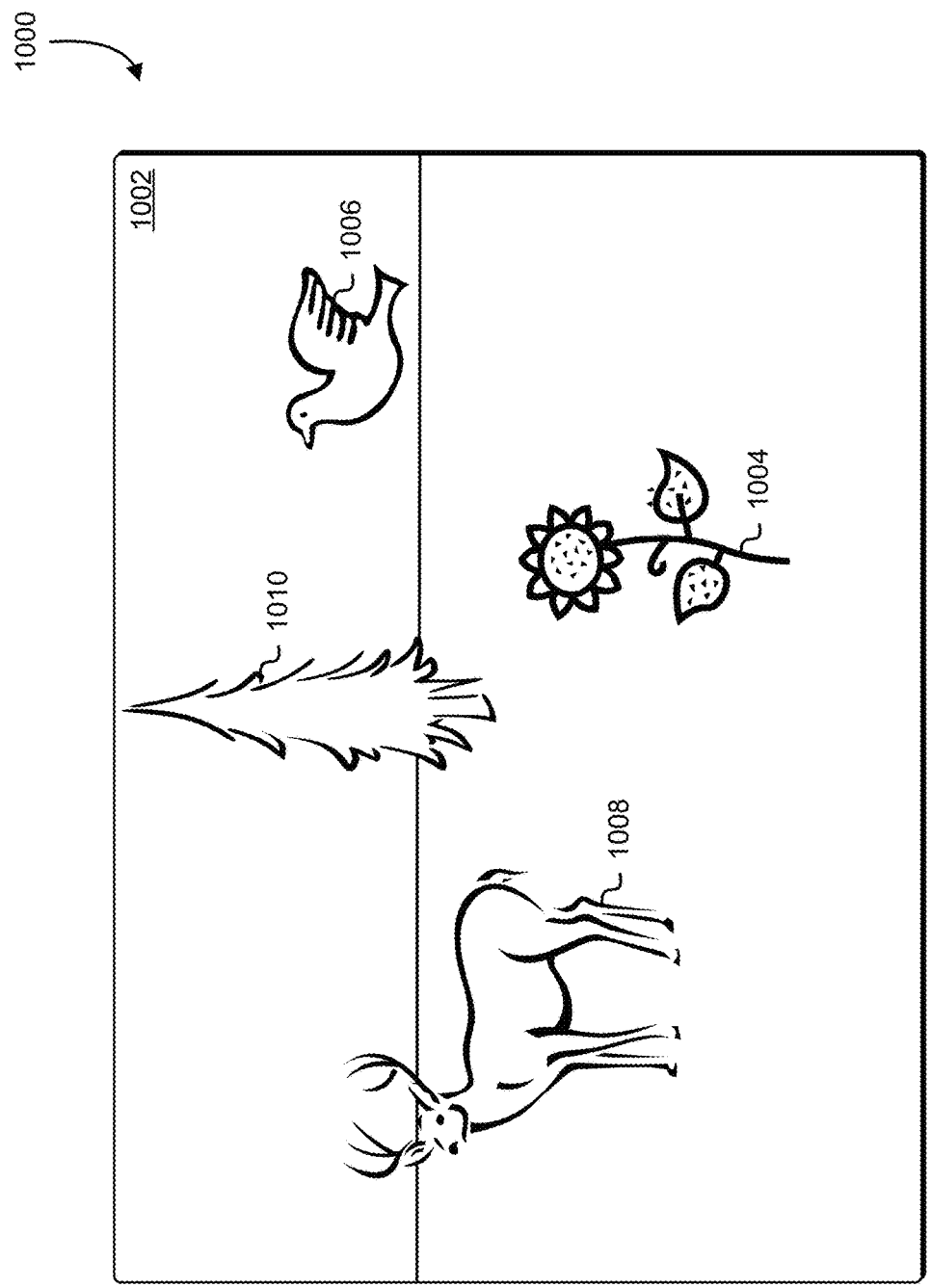
FIG. 10 illustrates an example of a final product of processing sets of image data captured during an image capture event with changing focal distances in accordance with at least one embodiment.

By collecting different sets of image data at different focal distances, the sets of image data 908A-08C may be visibly distinguishable from each other, if rendered as separate images, and information obtained by examining the differences between the sets of image data may be used for various purposes. For example, after the exposure period concludes, the sets of image data may be processed to generate a clear image, as illustrated in FIG. 10. The image processing may include determining the areas in the set of image data that are in focus at the distances of the focal plane. The determination of areas in focus may be performed by performing a passive analysis of the set of image data, such as by comparing intensity differences between adjacent pixels and/or comparing the pixel values in a set of image data with corresponding pixel values in other sets of image data obtained during the same image capture event exposure and/or any such method of determining focused areas within an image as would be understood by a person having ordinary skill in the art. By using information obtained by determining the areas of the image in focus at different focal planes, image processing may be performed, in some embodiments in conjunction with other image processing methods, such as the operations described in FIG. 5 and FIG. 7, to obtain a deblurred image, such as image 1002. For example, a flower 1004 may be deblurred using the image data 902A where the flower 904A was in focus. Likewise, a bird 1006 may be deblurred using the image data 902B where the bird 906B was in focus. Similarly, a deer 1008 may be deblurred using the image data 902C where the deer 909C was in focus, and a tree 1010 may be deblurred using the image data 902D where the tree 910D was most in focus. In such a manner, objects captured at all focal depths may be rendered in focus in the generated image.

In some embodiments, the image data at each focal distance, similar the image data depicted in 902A, 902B, 902C, and 902D of FIG. 9, may be stored separately or in layers within the image data. In such embodiments, a user may be able to select a particular focal depth and view the image generated from data captured at or near the selected focal depth. As an example, image data may be uploaded to a distributed computing system of a computing resource service provider and a user may be provided with a web interface for processing the image data, and the user may be able to select an object from the scene and the image may be processed such that the layer of image data in which the object is in focus, as determined by the depth value of that object, is retrieved and the image may be generated based on that layer of image data such that the image is in focus at that depth value. In some of these embodiments, the user may specify that image data captured at some or all focal depths up to the selected focal depth be rendered in focus, with the image data captured at focal depths beyond the selected focal depth rendered out-of-focus. Likewise, the user may specify that image data captured at some or all focal depths beyond the selected focal depth be rendered in focus, with the image data captured at focal depths up to the selected focal depth rendered out-of-focus.

Additionally, because the focal distance may be calculated based at least in part on the known measurements of aperture size and lens focus of the image capture device, a depth map of objects within the scene may be constructed. The depth map so constructed may be usable to apply three-dimensional effects to the image 1002. For example, if the viewpoint of the scene is moved some distance to the left, right, up, or down, a parallax of each of the objects in the scene may be calculated and the positions of the objects may be dynamically adjusted. Example uses of generating such three-dimensional effects include, but are not limited to, providing more realistic street views level views in mapping applications, and generating stereoscopic still images (i.e., adjusting for perspective differences between the viewpoints of each eye).

Note that other variations are contemplated as being within the scope of the present disclosure. For example, there may be more or fewer exposure periods as described in conjunction with FIG. 9, the focal plane may start at its most distant point and be brought closer over the exposure period, the focus may be changed in size according to another scheme as would be understood by a person having ordinary skill in the art. Furthermore, the focus described as changing may be changed to a particular point quickly, in steps, or the focus of the image capture device may change in a continuous and smooth transition at a constant or variable rate through the course of exposure (for example, as soon as the shutter is pressed, the focal plane begins to move from the closest distance to the farthest distance). That is, the focus may change from a default start focal distance to a final focal distance according to a function that has continuous derivatives over the range of the change from a point at or after the start of the first exposure to a point at or before the end of the second exposure. An advantage presented by this embodiment may be that, because the initial focus is predetermined, an image capture device may begin capturing an image without delays caused by determining an initial focal distance. For example, the focus may, by default, be initially at a nearest focal plane, and within 50 milliseconds after the shutter button is pressed, pixel elements may be continuously read or read at certain steps during the exposure while the focal distance is continuously increased or increased in steps until the focus reaches the farthest focal plane.

In some embodiments, pixel elements of the charge-coupled device image sensor array may be read out continuously during the exposure and depth maps of the image may be generated simultaneously with the image capture event. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

Figure 11:
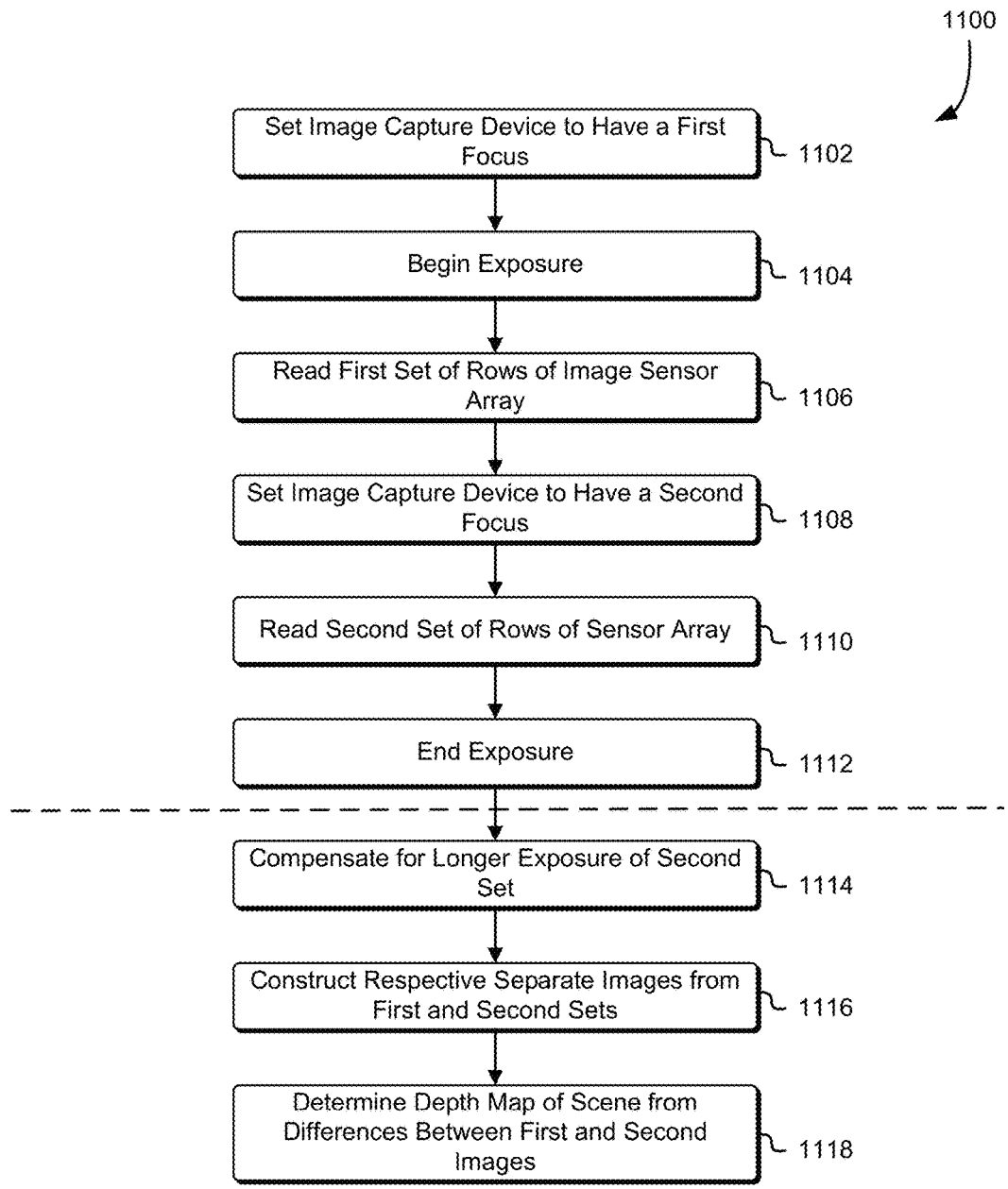
FIG. 11 is a block diagram that illustrates an example of determining a depth map from image data captured during an image capture event with changing focal distances in accordance with at least one embodiment.

FIG. 11 is a block diagram illustrating an example of a process 1100 for determining depth map information of an image in accordance with various embodiments. The process 1100 may be performed by any suitable image capture device, such as any of the image capture devices described in conjunction with FIG. 5. The process 1100 includes a series of operations in which a first set of image data is obtained from data captured during a first part of an exposure, then after a focus of the image capture device is changed, a second set of image data is obtained from data captured during a second part of the exposure, and depth map information is determined for objects in focus at the different parts of the exposure. As noted, the operations of process 1100 may be performed alone or in conjunction with either or both of the operations of process 500 of FIG. 5 and the operations of process 700 of FIG. 7.

In 1104, an image capture exposure begins, which may involve opening a shutter of the image capture device to allow light to enter the aperture configured in 1102 to reach an image recording component. Examples of a shutter include, but are not limited to, a mechanical shutter with one or more movable blades and an electronic shutter, such as a liquid-crystal display. It is noted that the image capture device may not necessarily have a shutter; the exposure period may begin with an operation analogous to opening a shutter, including, but not limited to, enabling power to an image recording component. It is further noted that 1102 may occur in concurrence with or at any time before 1104.

In 1106, a first set of rows of the charge-coupled device sensor array of the image capture device is read at the end of a first part of an exposure period. The charge-coupled device sensor array (e.g., having rows and columns) may be a two-dimensional array of pixel elements. Reading a row of the sensor array may include performing one or more shift-left or shift-right operation and reading the charge values of the individual pixel elements of the row. In some embodiments this may be performed every other row, in some embodiments this may be every third row, in some embodiments this may be every fourth row, and so on. In some embodiments, the rows to be read may be determined randomly.

In 1108, the focus may be modified to be different focus than the focus configured in 1102, which may include changing an aperture size or lens configuration. In 1110, a second set of rows of the charge-coupled device sensor array of the image capture device is read at the end of a second part of the exposure. In some embodiments, the second set of rows may be different than the first set of rows. As noted, the rows of the second set may be alternating every other row, every third row, every fourth row, and so on according to the particular embodiment, and in some embodiments the rows may be randomly determined. It is noted that some or all of operations 1106-10 may or may not be as repeated one or more times, according to the various embodiments disclosed. For example, there may be a reading of a third set of rows, a fourth set of rows, and so on according to the particular embodiment, and the sets of rows may correspond to a third aperture shape, a fourth aperture shape, and so on as dictated by the particular embodiment.

When the image capture period is over, in 1112, the exposure period is brought to a conclusion. This may involve closing a shutter of the image capture device to prevent further light from reaching the recording component through the aperture. However, it is noted that the image capture device may not necessarily have a shutter, and, in such a case, 1112 may instead include an operation analogous to closing a shutter, including, but not limited to, disabling power to an image recording component. The dashed line indicates that the operations after 1112 may be performed by either the image capture device performing steps 1102-12 or may be performed by one or more external devices as described in conjunction with FIG. 17, such as computer systems in a distributed computing system of a computing resource service provider. Furthermore, the operations of 1114-18 may be performed immediately following 1112, or at any time thereafter.

Because, in embodiments where the second set of rows is neither disabled during the first part of the exposure nor cleared before the beginning of the second part of the exposure, the second set of rows may have been collecting image data during both the first and second parts of the exposure. As noted, in some of these embodiments, processing may be performed on the second set of rows in 1114 to account for the additional image data collection; for example, occurrences of a first aperture shape in a second set of image data garnered from the second set of rows may be filtered out of the second set of image data. However, in some embodiments it may be useful to leave the extra image data in the second set of data; for example, the additional data may be useful in discerning details in shadowed areas of the captured image. Therefore, in some embodiments, the operations of 1114 may be omitted.

In 1116, the image data is compiled from the respective first and second rows. Note that 1116 may occur at various stages of the process 1100, or may be occur as separate operations (i.e., compiling image data from the first set of rows may occur at a different stage than compiling data from the second set of rows). The operations of 1116 may also be performed in parallel with other operations of the image capture process. For example, a first set of image data may be compiled in conjunction with reading the first set of rows of 1106. Likewise a second set of image data may be compiled in conjunction with reading the second set of rows of 1110. In some embodiments, the first and second sets of image data may be constructed into actual images, whereas in other embodiments, the first and second sets of image data may retained in memory or stored to a data store without being formatted as an image type.

In 1118, the first and second sets of image data may be analyzed to determine a depth map for objects within the scene based at least in part on the objects in focus in each of the image sets and the corresponding focal distance for each of the image sets, determinable based at least in part on the aperture size and the lens focus. As noted in the description of FIGS. 10 and 11, the determination of areas in focus may be performed by performing a passive analysis of the set of image data, such as by comparing intensity differences between adjacent pixels and/or comparing the pixel values in a set of image data with corresponding pixel values in other sets of image data obtained during the same image capture event exposure and/or any such method of determining focused areas within an image as would be understood by a person having ordinary skill in the art. As an example, a user may desire to capture an image quickly without determining where to apply focus in the scene. In this example, the user may capture the image with the variable focus of the present disclosure, and, at a later time, may select the focal depth and have the image rendered in focus at that depth based on the depth map information.

The depth map may also be usable to apply three-dimensional effects to the image 1002. For example, if the viewpoint of the scene is moved some distance to the left, right, up, or down, a parallax of each of the objects in the scene may be calculated and the positions of the objects may be dynamically adjusted. Example uses of generating such three-dimensional effects include, but are not limited to, providing more realistic street views level views in mapping applications, and generating stereoscopic still images (i.e., adjusting for perspective differences between the viewpoints of each eye), taking stereoscopic landscape photos, and generating three-dimensional models of objects in photos based on depth map information of the objects. Similarly, three-dimensional models of images captured within the scene may be generated based on the depth map information. As an example, a user may capture an image of a product, such as a shoe, in a retail store with the image capture device of the present disclosure, and a depth map of the scene may be constructed such that a three-dimensional model of the product (e.g., shoe) may be viewed from different perspectives.

Additionally or alternately, a depth map may be used to adjust focus in an image. That is, for aesthetic reasons, it may be desirable to have a particular object of interest in a scene to be in focus, with blur applied to other areas of the scene. Rather than a time-consuming and error prone method of specifically focusing on the object of interest, the depth map information, which may be a matrix of depth values of the scene, described in the present disclosure may be used to generate an image at having a focal plane at the depth of the object of interest.

In some embodiments, the depth map information may be stored in metadata within an image file. In other embodiments, each pixel may be stored with a corresponding color value and a depth value. For example, in an RGB (red/green/blue) based color model, each pixel may be stored with a red, green, blue, and a depth value (e.g., {128, 72, 28, 16}) corresponding to some unit of distance from the image sensor or image capture device.

In this manner, FIGS. 4-11 describe changing optical characteristics of the image capture device during an image capture event. As noted, the aperture may be changed in form (e.g., shape), size, or rotation, light/photon data may be read out from the charge-coupled device sensor array at different points during the exposure, and the focal distance may be changed during the exposure. Similarly, various other changes to optical characteristics of the image capture device during the image capture event as would be understood by a person having ordinary skill in the art are also contemplated as being within the scope of the present disclosure. For example, an aperture may be permitted to change a color filter during the exposure; e.g., an aperture may be configured to have a red filter during a first part of an exposure, a green filter during a second part of an exposure, and a blue filter during a third part of the exposure. A final, full-color image may be generated using the image data captured through each of the filters. Similarly, an image capture device may be configured to with a configurable polarizer to allow light at one polarization to pass through to an image recording component during a first part of an exposure and light at a different polarization to pass through to the image recording component during a second part of the exposure. In the latter example, an image may be generated using image data captured at different polarizations, such as by creating a composite image using the polarization data from the image capture event or performing deblurring processing based in part on differences in the image data captured at different polarizations.

Figure 12:
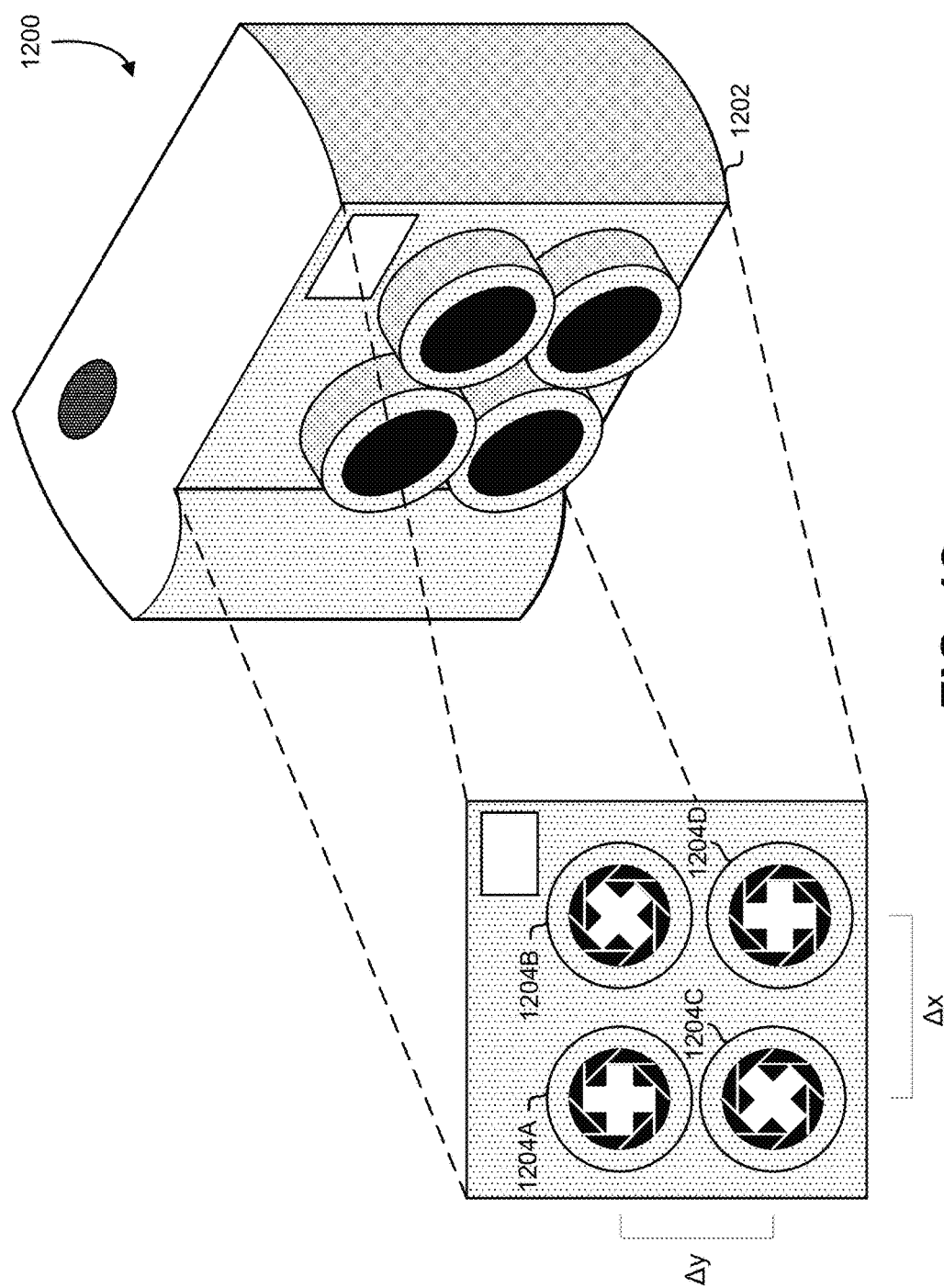
FIG. 12 illustrates an example of an image capture device in accordance with an embodiment.

FIG. 12 illustrates views 1200 of an embodiment of the present disclosure. Specifically, FIG. 12 depicts an example image capture device 1202 having a plurality—in this case four—apertures 1204A-04D associated with respective image recording components within the image capture device 1202. The image capture device 1202 is depicted in FIG. 12 for illustration purposes only, and other forms of image capture devices are contemplated in the scope of this disclosure, including, but not limited to, video cameras, digital cameras, cellular phone cameras, and film cameras. The image capture device 1202 is also depicted as having four apertures for illustration purposes only, and the image capture device 1202 of the present disclosure may include any number of a plurality of apertures. Furthermore, other embodiments described within the present disclosure may only have a single aperture.

The apertures 1204-A-04D may have different shapes; for example, the apertures 1204A and 1204D are depicted in cross-shapes and the apertures 1204B and 1204C are depicted in x-shapes. As noted, however, the apertures may be of any shape, such as any of the shapes described in conjunction with FIG. 2. Furthermore, although the apertures 1204A and 1204D are depicted as sharing the same shape and the apertures 1204B and 1204C are depicted as sharing the same shape, in some cases the apertures may all be of different shapes. For example, it may be desirable to the aperture 1204A as a cross-shape, the aperture 1204D as an inverted cross-shape, the aperture 1204B as an x-shape and the aperture 1204C as an inverted x-shape. When an inverse aperture is compared against non-inverse aperture, additional information about blurred regions may be obtained than may be easily obtained with non-inverse apertures alone. It must also be noted that the fixed apertures described in FIGS. 12-14, may be combined with other aspects of the present disclosure to be apertures that change during and/or between exposures.

Furthermore, some or all of multiple apertures of the present disclosure, such as the apertures 1204A-04D, may be set to different focal lengths. For example, in an embodiment where the image capture device 802 of FIG. 8 is a device like the image capture device 1202 of FIG. 12, the aperture 1204A may be configured to have a focal length of "Distance A" of FIG. 8, the aperture 1204B may be configured to have a focal length of "Distance B" of FIG. 8, the aperture 1204C may be configured to have a focal length of "Distance C" of FIG. 8, the aperture 1204D may be configured to have a focal length of "Distance D" of FIG. 8, with results similar to that described in conjunction with FIGS. 8-11. Additionally or alternatively, some or all apertures may be configured to collect only certain color information; e.g., the lens of each aperture may be configured with a different color filter. For example, aperture 1204A may have a red filter, aperture 1204B may have a green filter, and aperture 1204C may have a blue filter, and 1204D may have an infrared or ultraviolet filter. In some embodiments, this may be achieved by configuring the image capture device 1202 to have a color filter at each of the lenses (e.g., colored glass), and in other embodiments, color may be filtered at the image sensor or individual pixel element level (e.g., via filter material coating the sensor or pixel elements). A final, full-color image may be generated using the image data captured through each of the color filters. Note that, in this embodiment, alone or in combination with other embodiments disclosed, cost savings, greater resolution, and/or higher quality images may be achieved because color filters may be implemented with the lenses of the image capture device or separately with each sensor, thereby obviating the need for a mosaic of color filters on individual pixel elements.

Likewise, as noted above, other optical characteristics of the image capture device are also contemplated as being within the scope of the present disclosure. For example, the image capture device 1202 may be configured with one or more polarizers such that some or all of the apertures permit light having predetermined polarizations to pass through to image recording components. For example, aperture 1204A may receive only horizontally polarized light, whereas aperture 1204B may receive only vertically polarized light, aperture 1204C may receive only circularly polarized light, and 1204D may be configured to receive unpolarized light. An image may then be generated using the different polarization data, such as by creating a composite image using image data captured at different polarizations data from the image capture event or performing deblurring processing based in part on differences in the image data captured at different polarizations.

The image capture device may be configured to capture multiple images concurrently using apertures of one or more shapes. In such captured images, bokeh artifacts may be produced in each captured image that, when the images are compared with each other, may provide information about the scene, such as information useful for performing deblurring operations and/or generating a depth map of objects within the scene. Note that images captured with an image capture device with multiple apertures, such as the image capture device 1202 of FIG. 12 may exhibit parallactic differences due to the distances, Δx and Δy, between the apertures 1204A-04D capturing the images. In some embodiments, the images may be processed to mitigate the effects of parallax on a final generated image, however in other embodiment, detected parallactic offsets within the images may provide information useful in constructing a depth map about objects within the scene. For example, in the latter case, the detected parallaxes between images captured through apertures 1204A-04D may be useful in generating three-dimensional images of the objects within the scene and may be useful in providing multi-angle views of the scene from one image capture event. Furthermore, such depth map information may be useful in generating stereoscopic images, such as for use in a three-dimensional video camera where the parallactic information may be used to generate a perspective view of the scene for each eye and, as noted, the distinctive apertures may be used to gather information about the scene for deconvolution processing.

The image capture device 1202 may additionally or alternately be configured to capture multiple images concurrently with individual lenses/apertures set to various focal depths. For example, the lens/aperture associated with aperture 1204A may be configured to have a focal depth of two feet, the lens/aperture associated with aperture 1204B may be configured to have a focal depth of four feet, the lens/aperture associated with aperture 1204C may be configured to have a focal depth of eight feet, and the lens/aperture associated with aperture 1204D may be configured to have a focal depth of 16 feet. In such an embodiment, the images captured by the image capture device 1202 may be used for generating and processing images in accordance with the embodiments described in conjunction with FIGS. 8-11, such as deblurring, providing images capable of being displayed according to different focal planes, and constructing a depth map. Note that the process for constructing a depth map as described in conjunction with FIGS. 8-11 may be combined with the process of constructing a depth map based on parallactic differences between the images, as described in conjunction with FIG. 12 to achieve a highly-accurate depth map.

Figure 13:
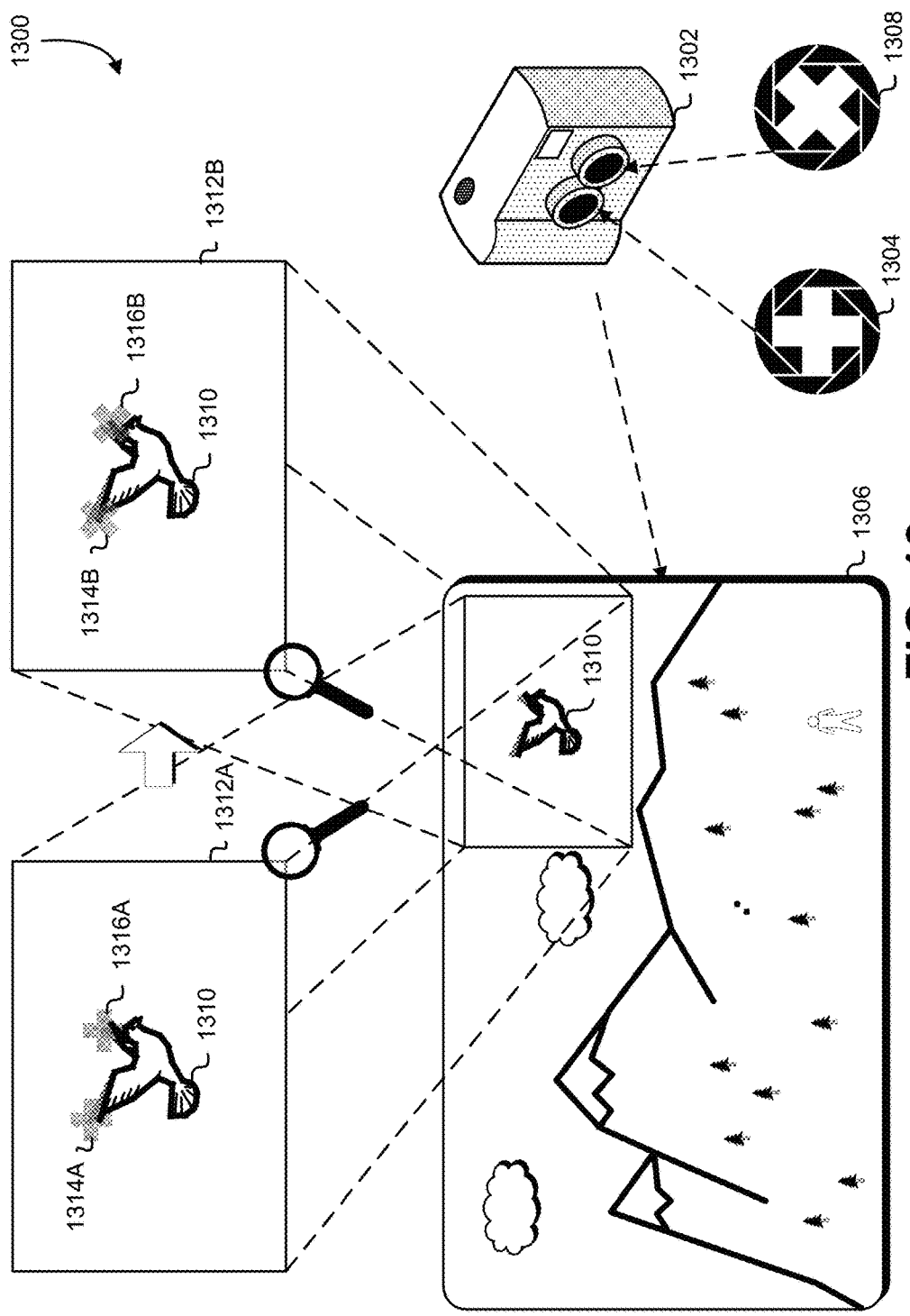
FIG. 13 illustrates bokeh artifacts that may be produced when objects are blurred in accordance with at least at least one embodiment.

As illustrated in FIG. 13, the embodiment 1300 may include an image capture device 1302 having two distinguishable fixed aperture shapes, aperture 1304 and aperture 1308 shapes capturing an image of a scene 1306. As noted, the image capture 1302 may be any device usable for capturing images, including, but not limited to, still cameras and movie cameras that capture images from light using film or from light using analog or digital electronic means, such as image sensors, such devices may include, but are not limited to, video cameras, digital cameras, cellular phone cameras, and film cameras. Although the aperture 1304 and 1308 shapes are shown as a cross-shape and x-shape respectively, this is for illustrative purposes only, and the aperture 1304 and 1308 shapes may be any distinguishable shapes, including, but not limited to, the aperture shapes of example 200 in FIG. 2. Similarly, the scene 1306 may be any scene. Examining the scene 1306 up close, the effect that the aperture shapes 1304 and 1308 produce on objects that are blurred may be seen. In the scene 1306, a bird 1310 is an object in motion within the scene, and the flapping of the wings of the bird 1310 has produced blurring during the image capture event. In the zoomed view 1312A of the scene captured through the aperture 1304, bokeh artifacts 1314A and 1316A in the shape of aperture 1304 are produced at the position of the wingtips of the bird 1310 due to motion blur during the exposure. Likewise, the zoomed view 1312B of the scene captured through the aperture 1308 depicts bokeh artifacts 1314B and 1316B in the shape of the aperture 1308 at the position of the wingtips of bird 1310. Thus, the scene of the image captured through the aperture 1304 may be visibly distinguishable from the scene of the image captured through the aperture 1308. The scenes may also be visibly distinguishable due to parallactic differences caused by the offset distance between the image capture sensors associated with the respective apertures 1304 and 1308. In some embodiments, the multiple images may be subjected to parallactic processing to remove parallactic effects caused by the parallactic differences. In other embodiments, the parallactic effects may be useful in determining a depth map for objects in the images.

Note that in this illustration of the embodiment 1300, the bokeh artifacts captured at the different stages of the image capture event correspond with each other. For example, bokeh artifact 1314A corresponds with bokeh artifact 1314B and bokeh artifact 1316A corresponds with bokeh artifact 1316B. By analyzing differences between the corresponding artifacts, such as changes in color and intensity, information about details that may be obscured by blurring in one or both images may be determined. With knowledge of such information about the blurred areas, deconvolution processing can be made to more effectively remove blurring from the image at those regions.

Figure 14:
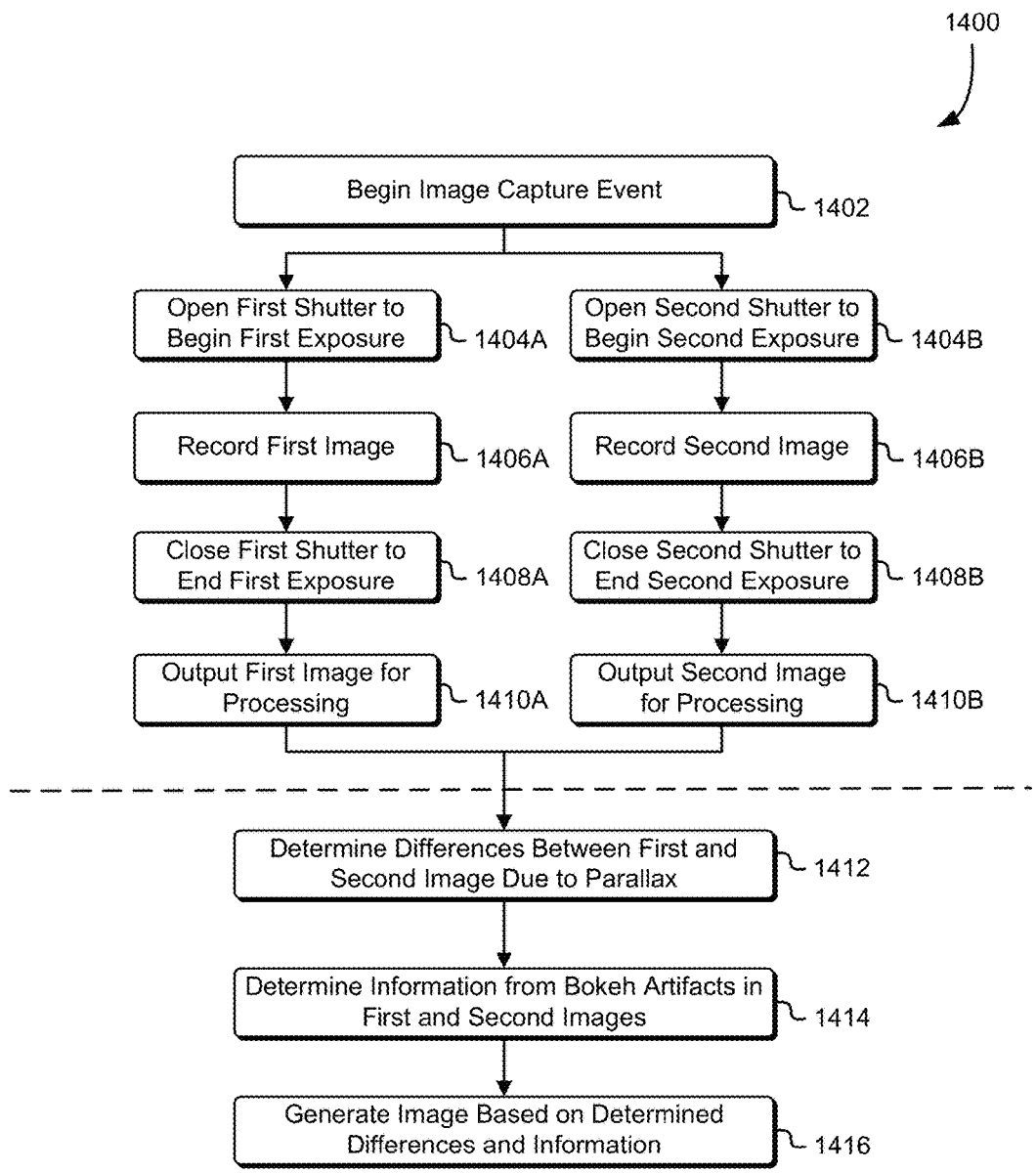
FIG. 14 is a block diagram that illustrates an example of capturing simultaneous images using an image capture device in accordance with an embodiment.

FIG. 14 is a block diagram illustrating an example of a process 1400 for performing a multiple image capture in accordance with various embodiments. The process 1400 may be performed any suitable image capture device, such as any of the user devices described in FIG. 5. The process 1400 includes a series of operations in which multiple images are captured simultaneously, processing is performed based on parallactic and bokeh artifacts, and a final image is generated based on the processing.

In 1402, an image capture event starts. In some embodiments, an image capture event may be started by a user pressing a shutter button of the image capture device or pressing a shutter icon on a touch screen of a smart phone. In 1404A and 1404B, the exposures of using the two different apertures begin simultaneously, which may involve opening a first and second shutter of the image capture device to allow light to enter the apertures, such as the apertures depicted in FIG. 13, to reach a first and second image recording component. Examples of shutters include, but are not limited to, mechanical shutters with movable blades and electronic shutters, such as a liquid-crystal displays. It is noted that the image capture device may not necessarily have shutters; the exposure period may begin with an operation analogous to opening a shutter, including, but not limited to, enabling power to an image recording component.

In 1406A and 1406B, the simultaneous recording of a first and second image is performed. For example, the operations of 1406A and 1406B may include, for a digital camera, allowing a capacitive charge to build up on pixel elements of a charge-coupled device image sensor, such as the image sensor 302 described in conjunction with FIG. 3. In 1408A and 1408B the exposure periods for the first and second images are simultaneously ended, which may involve closing of the first and second shutter of the image capture device to stop light from entering the apertures. In embodiments where the image capture device may not have shutters per se or may have electronic shutters, the exposure periods may end with an operation analogous to the closing of the shutters or removing power from an image recording component.

In 1410A and 1410B, the image recording is finalized for the first and second images, which may include reading out the pixel elements of a charge-coupled device image sensor array. The image data for the first and second image may be output in a variety of ways, such as, but to be limited to, outputting to one or more files, or in a photographic film camera, may be processed into physical photographs (which may be scanned into digital form later for parallactic and/or bokeh artifact processing), or may be retained as image data within the memory of the image capture device.

After operations 1410A and 1410B, the processing of the first and second images may begin. The dashed line indicates that the operations after 1410A and 1410B may be performed by either the image capture device performing steps 1402-10 or may be performed by one or more external devices as described in conjunction with FIG. 17, such as computer systems in a distributed computing system of a computing resource service provider. Furthermore, the operations of 1412-16 may be performed immediately following 1410A and 1410B, or at any time thereafter. It must also be noted that the operations of 1412-16 may be performed in various orders, including in parallel, and each operation may be performed by one or more devices different from the devices performing any of the other operations in process 1400. It is further noted that there may be more than two shutters operating, image recording components recording, and images being produced simultaneously between operations 1402 and 1412, duplicating the operations described in conjunction with of the operations 1404A-04B, 1406A-06B, 1408A-08B, and 1410A-10B.

In 1412, the first and second images (or first and second sets of image data) may be compared to find any detectable differences between the first and second images due to parallax caused by a difference in viewpoint distance between the first and second apertures. The information gathered in 1412 may be used for a variety of purposes alone or in conjunction with each other, including mitigating the effects of parallax on a final generated image, determining or aiding in the determination of a depth map for objects in the scene, or for generating stereoscopic views of the scene in a stereoscopic image pair.

In 1414, the first and second images may be compared to find corresponding bokeh artifacts in each image; that is, bokeh artifacts may be identified in the first image and bokeh artifacts corresponding to those identified bokeh artifacts in the first image may be identified in the second image. By comparing the information of the blurred regions (i.e., the areas within the images containing the identified bokeh artifacts with shapes corresponding to the distinct aperture shapes) between the first and second images, information useful for deconvoluting the images may be obtained. For example, it may be imagined that the first image is the result of an exemplary image that has been convoluted using an aperture with a first shape, and the second image is the result of the same exemplary image that has been convoluted using an aperture with a second shape. The common variable in this example then, between the first image and the second image, is the exemplary image. Thus, with the goal being able to recreate the exemplary image, processing may be performed on the first and second images iteratively until the first and second images converge to an estimation of the exemplary image; e.g., deconvolution processing may be performed iteratively on each set of image data until the blurred areas of the image data are harmonized to a comparable level of clarity to produce a final deblurred image. This example represents at least one way that information obtained by comparing bokeh artifacts between two simultaneously captured images may be used to produce a deblurred final image. Note that in some embodiments, parallax mitigating operations of 1412 may have been performed on the first and second images before 1414, whereas in other embodiments the 1414 operations may be performed after or in parallel with 1412, and in other embodiments the operations of 1412 may be omitted. Likewise, the operations of 1414 may be omitted in some embodiments.

Finally, in 1416, an image based on parallactic information and/or bokeh artifact information may be generated. As described, this image may be an exemplary/deconvoluted image and/or a three-dimensional or stereoscopic image. In some embodiments, the image may be one image with depth map information embedded as metadata, with the depth map information usable to display the images from different viewing angles or display objects within the image stereoscopically or to generate three-dimensional models from the image. In some embodiments, the image may comprise a plurality of layers of images, with each layer comprised of the rows of pixel elements that were read out at a particular focal depth, with metadata embedded in the image associating the particular focal depths with the corresponding image layers; in such a way, the view at any of the captured focal depths may be retrieved by displaying its corresponding layer. For example, if an image is captured with variable focus and a user desires to view an image where a particular object is in focus, and the particular object was in focus when the variable focal depth was ten feet, an image constructed from data read from the charge-coupled device image sensor when the focal depth was at ten feet may be displayed. As another example, if the user desires to view everything in the image up to a focal depth of ten feet in focus, but everything beyond a focal depth of ten feet out-of-focus, the image data may be processed such that image data read from the charge-coupled device image sensor array up to the focal depth of ten feet are in focus, such with the examples described in conjunction with FIGS. 8-11, and focus processing may not be performed on image data for focal depths beyond ten feet.

Figure 15:
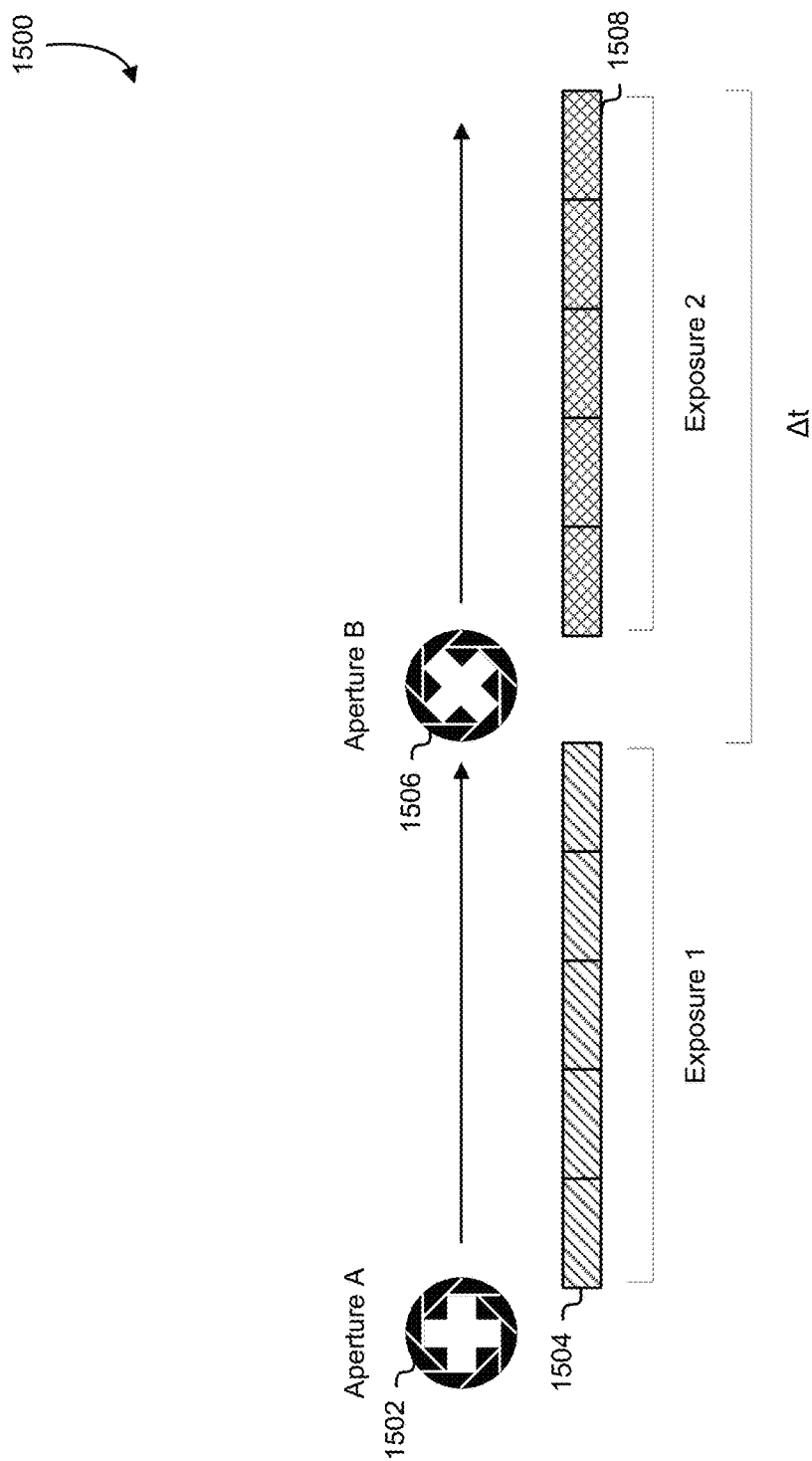
FIG. 15 illustrates an example of successive image capture events with a changing aperture in accordance with an embodiment.

FIG. 15 illustrates a representation of an embodiment 1500 of the present disclosure. Specifically, FIG. 15 depicts an example of an image capture device of the present disclosure capturing a first image using a first aperture shape 1502 from a first exposure 1504 and then capturing an image using a second aperture shape 1506 from a second exposure 1508. The first aperture shape 1502 may be any shape, including, but not limited to, the aperture shapes disclosed regarding FIG. 2, and likewise the second aperture shape 1506 may be any aperture shape different from the first aperture shape 1502, including, but not limited to, the aperture shapes discussed in conjunction with FIG. 2.

In particular, an aperture of an image capture device may be set to the aperture shape 1502, and subsequently an image capture event may begin—such as by opening a shutter or activating a charge-coupled device sensor. During the first exposure 1504, light may pass through the aperture shape 1502 onto an image recording component of the image capture device. In some embodiments, the image recording component may be a digital image sensor, while in other embodiments, an image recording component of photographic film or film stock is also contemplated as being within the scope of the present disclosure. At the end of the exposure period, a first image may be finalized and recorded, which in some embodiments may include reading the rows of a charge-coupled device image sensor array or advancing the film.

At this point, the aperture may be changed to a different shape, such as aperture shape 1506, and the second exposure 1508 for a second image may be started. Note that in some embodiments, the aperture may be changed to the different shape immediately, whereas, in other embodiments, the aperture shape may be changed in a smooth, continuous transition. That is, the aperture may change according to a function that has continuous derivatives over the range of the change from a point at or after the start of the first exposure to a point at or before the end of the second exposure, or the aperture may change according to a function that has partial derivatives over multi-dimensional rates of change. At the conclusion of the second exposure 1508, which has been exposed to light passing through the second aperture shape 1506, the second image may be finalized and recorded in the same way as the first image was finalized and recorded. Note that, unlike the simultaneously-captured images of the embodiments described for FIGS. 12-14, the differences between the first and second images of the embodiment depicted in FIG. 15 may be due in part to changes in the scene over time, such as the time between the ends of the first and second exposures, Δt. Thus, the first and second images captured by the embodiment may be visibly distinguishable not only due to the change of the aperture from the aperture shape 1502 to the aperture shape 1506, but also because the scene may have shifted or objects within the scene may have moved over time, Δt. Note also that while the illustration of FIG. 15 only shows two exposures that result in two captured images, a series of many exposures resulting in many captured images is also contemplated as being within the scope of the present disclosure.

Thus, after the end of the second exposure 1508, two sets of image data may have been captured, and bokeh effects caused by motion blur and the aperture shapes 1504 and 1506 may be detected in the respective first and second images. Bokeh artifacts found in one image may be mapped to corresponding bokeh artifacts of the second image, and information about the motion of the camera and/or motion of objects within the scene, such as motion vectors indicating direction and speed of objects in motion, may be obtained. For example, if a bokeh artifact due to motion blur in the second image has moved a certain distance in a certain direction as compared to its corresponding artifact due to motion blur in the first image, a determination of the speed and direction of travel of the object in motion may be made. Such information may be utilized for deconvolution and/or depth map processing. In some embodiments, the determined motion vectors may be associated with objects or groups of pixels in the image. In other embodiments, the determined motion vectors may be associated with the individual pixels of the image. In some of these embodiments, the motion vectors associated with pixels may be stored as metadata for the image, and in other embodiment the motion vectors may be stored in a file format where each pixel value comprises a color value and a motion vector.

Further detail on the detection of bokeh artifacts due to changing apertures and deblurring using the information obtained from the bokeh artifacts may be found in in co-pending U.S. patent application Ser. No. 14/458,118, filed concurrently herewith, entitled "VARIABLE TEMPORAL APERTURE", which is incorporated by reference.

Figure 16:
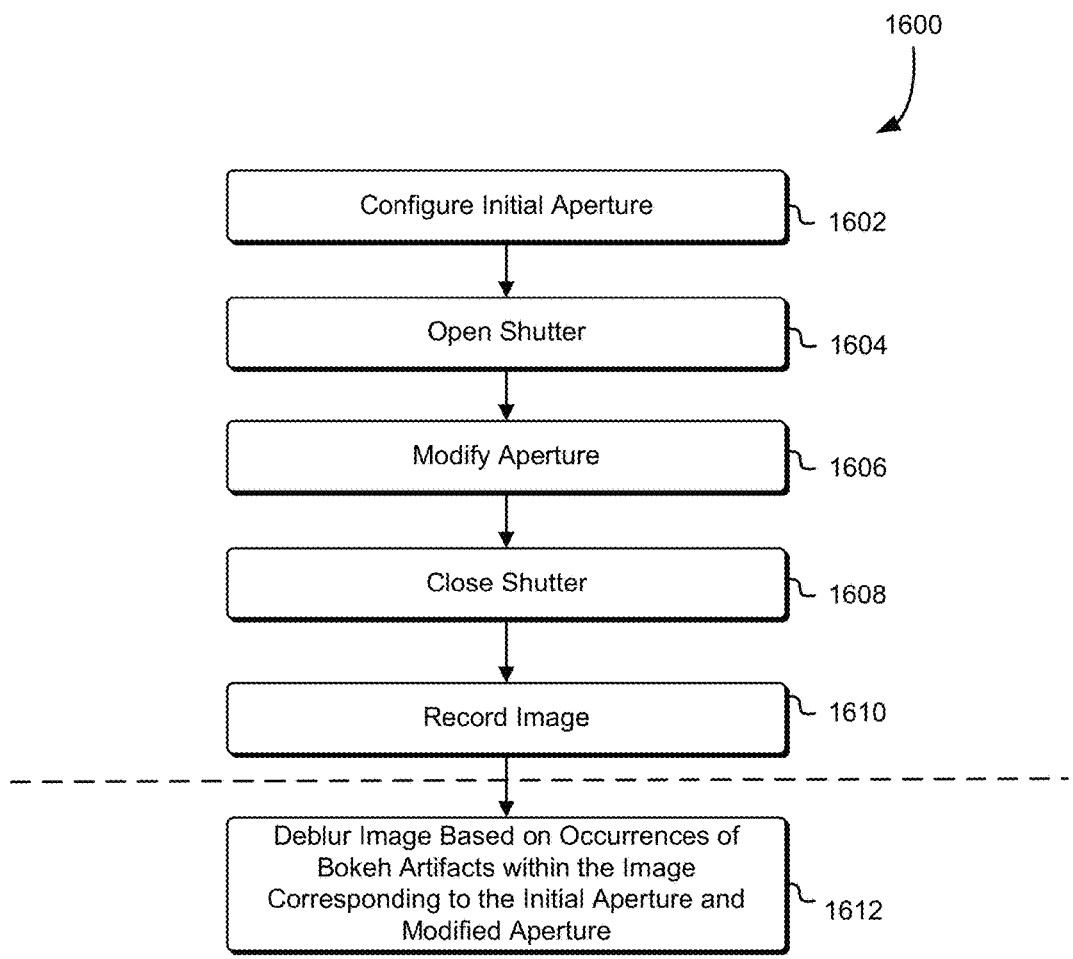
FIG. 16 is a block diagram that illustrates the operation of an image capture device in accordance with at least at least one embodiment.

FIG. 16 is a block diagram illustrating an example of a process 1600 for capturing and deblurring an image in accordance with various embodiments. The process 1600 may be performed by any suitable image capture device, such as any of the user devices described in FIG. 5. The process 1600 includes a series of operations in which an image capture device with a variable aperture captures at least one image over one or more exposures and performs deblurring operation based on bokeh artifacts detected in the at least one captured image. In 1602, an aperture of an image capture device may be configured to be a distinguishable shape. As noted, the distinguishable shape may be any shape, including, but not limited to, the aperture shapes disclosed regarding FIG. 2.

In 1604, a shutter of the image capture device may be opened to allow light to enter the aperture configured in 1602 to reach an image recording component. Examples of a shutter include, but are not limited to, a mechanical shutter with one or more movable blades and an electronic shutter, such as an LCD. It is noted that the image capture device may not necessarily have a shutter, and, in such a case, 1604 may be omitted or replaced with a step operating analogous to opening a shutter, including, but not limited to, enabling power to an image recording component. It is further noted that 1602 may occur in concurrence with or at any time before 1604.

In 1606, the aperture may be modified to be different than the aperture configured in 1602. It is noted that the shutter may be closed after between operations 1604 and 1606, and reopened after 1606. It is noted that operations 1604-06 may be repeated often as desired, according to the various embodiments disclosed.

Note that modifying the aperture indicates that an optical characteristic of the image capture device is changed. In some embodiments, the aperture may change in form (e.g., shape), size, or rotation. In other embodiments, the focus may be changed. Similarly, various other changes to optical characteristics of the image capture device during the image capture event as would be understood by a person having ordinary skill in the art are also contemplated as being within the scope of the present disclosure. For example, a color filter may be changed in 1606 to permit different colors of light to reach the image recording component of the image capture device; e.g., a red color filter may be active during a first exposure, the red color filter may be switched to a green color filter for a second exposure, the green color filter may be switched to a blue color filter for the third exposure, and the blue color filter may be switched to an infrared color filter during the fourth exposure. Similarly, the image capture device may be equipped with a configurable polarizer and capture light having a certain polarization during a first exposure, and capture light having a different polarization during a second exposure, and so on. Note that these and other embodiments may be combined with the various embodiments described in the present disclosure; for example, one or more aperture may be configured to have optical characteristics of shape, focus, color, and polarization, any or all of which may change synchronously or asynchronously between exposures or at various points during the same exposure.

In 1608, the shutter of the image capture device may be closed to prevent further light from reaching the recording component through the aperture. It is noted that the image capture device may not necessarily have a shutter, and, in such a case, 1608 may be omitted or replaced with a step operating analogous to closing a shutter, including, but not limited to, disabling power to an image recording component. It is further noted that if the shutter is closed before operation 1608, it may be reopened between operations 1606 and 1608.

In 1610, the recording of the image may be finalized. It is noted that image recording process, such as for an image capture device that records image onto a film medium, may begin at or before 1602 and may be an ongoing process throughout any or all operations 1602-10. Likewise, if the image recording component is an electronic device, the image recording process may be a process that stores and/or updates an image onto computer-readable media throughout any or all operations 1602-10.

In 1612, a deblurring operation may be performed on one or more captured images recorded during one or more operations 1602-10, according to the various embodiments described. The dashed line indicates that the deblurring operation may be performed by either the image capture device described in 1602 performing steps 1602-10 or may be performed by one or more external devices 908 described regard to in FIG. 17. The deblurring operation may be performed immediately following 1610, or at any time thereafter.

It is noted that the operations of process 1600 may be performed in various orders, including in parallel, and each operation may be performed by one or more devices different from the devices performing any of the other operations in process 1600. It is further noted that one or more image capture devices may be duplicating the operations of process 1600 in various orders, including, but not limited to, sequentially, in parallel, or in concurrence. It is further noted that the operations of process 1600 may be performed to capture one image in a single exposure, one image over multiple exposures, or multiple images having multiple exposures. The images generated according to the techniques described in the present disclosure may be stored with embedded metadata detailing how the image was taken. For example, the metadata may include information indicating the point during the exposure that rows were read from the charge-coupled device image sensor array, the rows of the image sensor array that were read at the point in the exposure, the focal depth at the point in the exposure, an offset of the image sensor of the image capture device for determining parallactic information, an aperture shape, and other information in addition to information such as a camera make and model, GPS location, and camera orientation.

Figure 17:
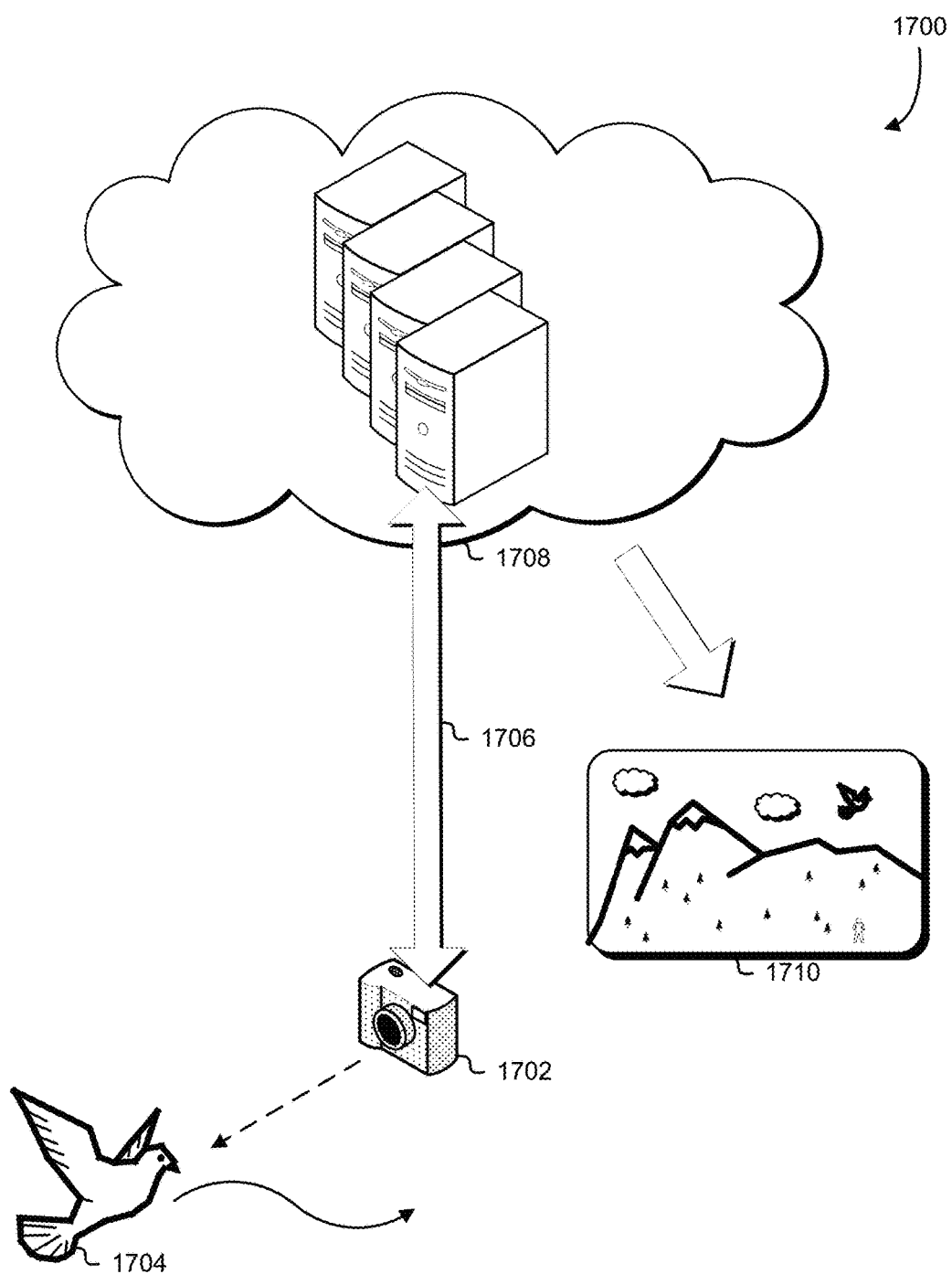
FIG. 17 illustrates an example of remote image processing in accordance with at least at least one embodiment.

As illustrated in FIG. 17, the environment 1700 may include an image capture device 1702 capturing an image of a scene according to various embodiments of the present disclosure. For purposes of illustration, the image capture device 1702 in environment 1700 is depicted as capturing an image of a bird 1704 in flight; however the captured scene may be any scene. As noted, the image capture device 1702 may be any device usable for capturing images, including, but not limited to, still cameras and movie cameras that capture images from light. The device may comprise a lens and an external housing enclosing a recorder component for capturing the images from light, such as film or analog or digital electronic means, such as image sensors. Such devices may include, but are not limited to, video cameras, digital cameras, cellular phone cameras, and film cameras. Further, the image capture event may include a single image, multiple images captured sequentially, or multiple images captured concurrently.

In the environment 1700 depicted in FIG. 17, at least one image is captured by the image capture device 1702 and transferred or copied through a communication channel 1706 to one or more external devices 1708. The communication channel 1706 may be any type of communication channel by which two or more devices may communicate, including, but not limited to, physical network cables, wireless communications, universal serial bus (USB), serial, parallel, and other conduits. The communication channel 1706 may further be configured to communicate through, among others, the Internet, an intranet, wide area network (WAN), local area network (LAN), and direct connection. The communication channel 1706 may further be configured to facilitate communications of any type of communication protocol, including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others.

The communications channel 1706 may also represent the physical movement of media holding at least one image, such as transporting a flash card, USB drive, magnetic media, optical media, or some other media to another device which may further copy or transfer the at least one image to one or more other media or to the one or more external devices 1708. From there, the at least one image may be further copied to one or more other media, or may be accessed by the one or more external devices 1708. The one or more external devices 1708 may comprise a single computer, laptop, tablet, server, distributed computing system, one or more virtual computing devices executing on one or more physical devices or configured to execute instructions for performing data computation, manipulation or storage tasks. The one or more external devices 1708 further be connected to the image capture device 1702.

The one or more external devices may perform at least a portion of the deblurring operations described on the at least one image to produce one or more images 1710 with blurring reduced or eliminated. Advantages of transferring at least one image to the one or more external devices 1708 may include, but not be limited to, access to increased processing power for more efficient image processing than may be performed on the image capture device 1702 alone, immediate sharing of image with other users having access to the one or more external devices 1708, and taking advantage of increased data storage capability of the one or more external devices 1708 than may be available on the image capture device 1702.

The device may comprise a lens and an external housing enclosing a recorder component for capturing the images from light, such as film or analog or digital electronic means, such as image sensors. Such devices may include, but are not limited to, a video camera, a digital camera, a cellular phone camera, a film camera, a laptop or desktop computer, a tablet, a mobile phone or a smartphone, a smart television. Such devices may further comprise internal memory, examples of which include, but are not limited to, random access memory, flash recording media, and magnetic recording media. Such devices may further be under the control of a processor, such as, but not limited to, a central processing unit, graphics processing unit, or microcontroller. The image capture device may be configured to communicate using any type of communication protocol including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others.

The image capture device may be equipped with a processor, such as a central processing unit (CPU) or a graphics processing unit (GPU) that provides computing functionality to a user. Examples of a CPU include those utilizing a complex instruction set computing (CISC) architecture, such as the x86 CPU, and others that utilize a reduced instruction set computing (RISC) architecture, such as the advanced RISC machine (ARM) CPU. The image capture device may also be equipped with one or more input peripherals, such as a touch screen that responds to a fingertip or a stylus input, a physical keyboard, a digital camera, a microphone, a touchpad or a mouse, among others.

Figure 18:
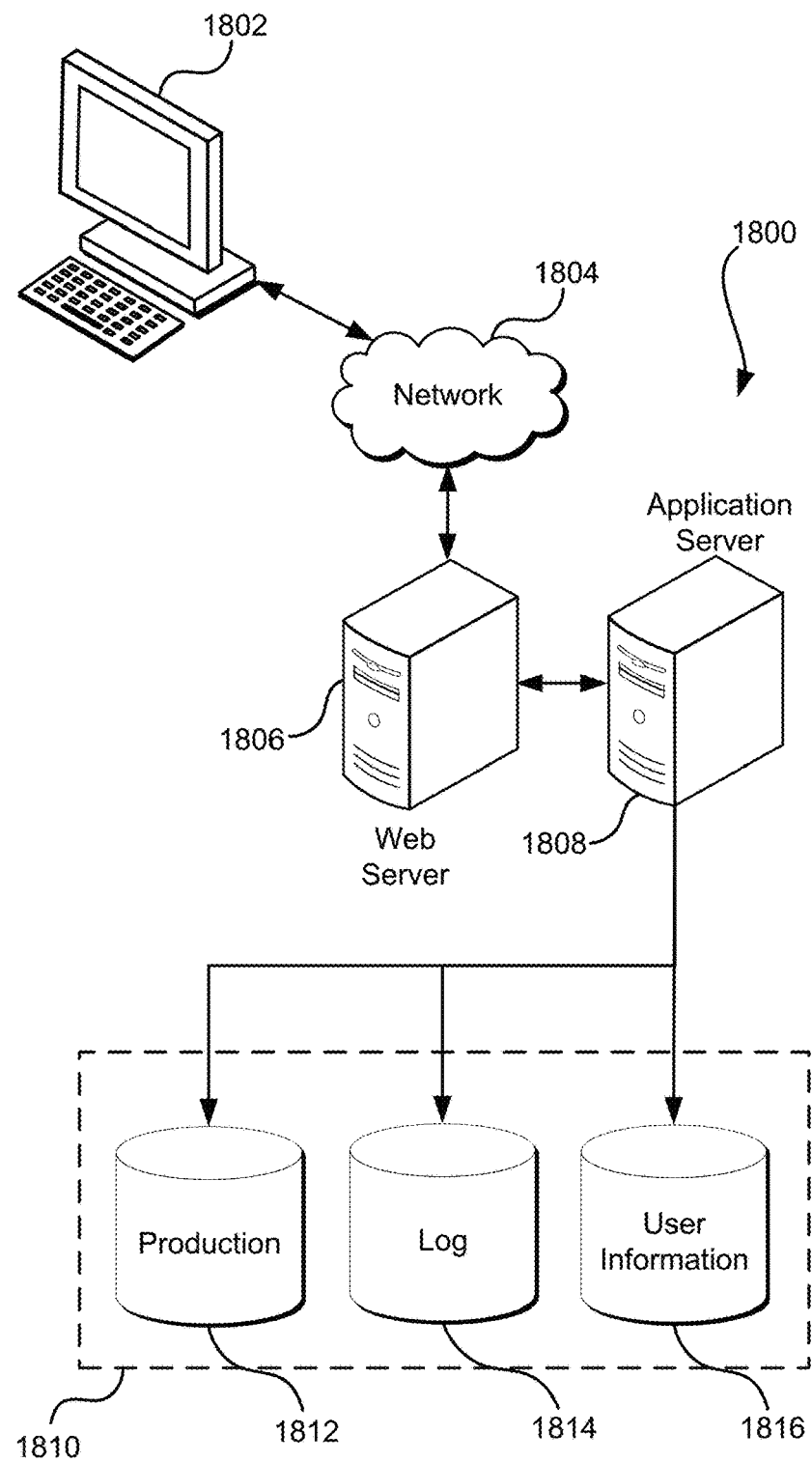
FIG. 18 illustrates an environment in which various embodiments can be implemented.

FIG. 18 illustrates aspects of an example environment 1800 for implementing aspects in accordance with various embodiments. As will be appreciated, although a web-based environment is used for purposes of explanation, different environments may be used, as appropriate, to implement various embodiments. The environment includes an electronic client device 1802, which can include any appropriate device operable to send and/or receive requests, messages or information over an appropriate network 1804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 1806 for receiving requests and serving content in response thereto, although for other networks an alternative device serving a similar purpose could be used as would be apparent to one of ordinary skill in the art.

The illustrative environment includes at least one application server 1808 and a data store 1810. It should be understood that there can be several application servers, layers or other elements, processes or components, which may be chained or otherwise configured, which can interact to perform tasks such as obtaining data from an appropriate data store. Servers may be implemented in various ways, such as hardware devices or virtual computer systems. In some contexts, servers may refer to a programming module being executed on a computer system. Unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1802 and the application server 1808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 1810 can include several separate data tables, databases, data documents, dynamic data storage schemes and/or other data storage mechanisms and media for storing data relating to a particular aspect of the present disclosure. For example, the data store illustrated may include mechanisms for storing production data 1812 and user information 1816, which can be used to serve content for the production side. The data store also is shown to include a mechanism for storing log data 1814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1810. The data store 1810 is operable, through logic associated therewith, to receive instructions from the application server 1808 and obtain, update or otherwise process data in response thereto. The application server 1808 may provide static, dynamic or a combination of static and dynamic data in response to the received instructions. Dynamic data, such as data used in web logs (blogs), shopping applications, news services and other such applications may be generated by server-side structured languages or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1800 in FIG. 18 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications and patents, cited are hereby incorporated by reference to the same extent as if each reference were individually and specifically indicated to be incorporated by reference and were set forth in its entirety.

What is claimed is:

1. A method, comprising:
   obtaining a first set of image data, from a first set of sensors of a sensor array of an image capture device, wherein the first set of image data corresponds to light passing through a first aperture of the image capture device during an image capture event, the first aperture associated with a first focal length;
   obtaining a second set of image data, from a second set of sensors of the sensor array of the image capture device, wherein the second set of image data corresponds to light passing through a second aperture of the image capture device during the image capture event, the second aperture associated with a second focal length distinct from the first focal length;
   changing a focus of the image capture device from a first focus setting to a second focus setting during the image capture event; and
   generating an image based at least in part on the first set of image data and the second set of image data.

2. The method of claim 1, further comprising:
   obtaining a third set of image data from the first set of sensors or the second set of sensors during the image capture event, the third set of image data being captured at a third focus setting distinct from the first focus setting and distinct from the second focus setting.

3. The method of claim 1, further comprising generating depth map information based at least in part on at least one of the first set of image data and the second set of image data.

4. The method of claim 3, wherein the depth map information is generated based at least in part on information representing objects captured during the image capture event.

5. The method of claim 3, wherein the image is generated based at least in part on applying the depth map information to at least one of the first set of image data and the second set of image data.

6. The method of claim 1, wherein generating the image includes rendering image data captured at a first focal depth to be in focus in the image, and rendering image data captured at a second focal depth to be out of focus in the image.

7. The method of claim 1, wherein the first aperture includes a first aperture size and the second aperture includes a second aperture size.

8. The method of claim 1, wherein the first aperture and the second aperture are formed by different states of a changeable aperture.

9. The method of claim 8, wherein the changeable aperture alternates between a first state of the first aperture and a second state of the second aperture by a mechanical method.

10. The method of claim 8, wherein the changeable aperture alternates between a first state of the first aperture and a second state of the second aperture by an electrical method.

11. A system, comprising:
one or more processors; and
memory including instructions that, as a result of execution by the one or more processors, cause an image capture device to:
obtain a first set of values from a first set of sensors of an image sensor array of the image capture device, the first set of values corresponding to light passing through a first aperture of the image capture device during an image capture event;
obtain a second set of values from a second set of sensors of the image sensor array of the image capture device, the second set of values corresponding to light passing through a second aperture of the image capture device during the image capture event, wherein a first focal length associated with the first aperture of the image capture device is different than a second focal length associated with the second aperture of the image capture device;
change a focus of the image capture device from a first focus setting to a second focus setting during the image capture event; and
generate an image based at least in part on the first set of values and the second set of values.

12. The system of claim 11, wherein the memory further includes instructions that, as a result of execution by the one or more processors, cause the image capture device to:
analyze the first set of values to identify a first set of objects in focus in a scene captured by the image capture device during the image capture device at a first focal distance, and analyze the second set of values to identify a second set of objects in focus in the scene at a second focal distance.

13. The system of claim 12, wherein the memory further includes instructions that, as a result of execution by the one or more processors, cause the image capture device to:
determine a set of objects from the first set of objects or the second set of objects, wherein the image is generated such that the set of objects are in focus and other objects in the first set of objects and the second set of objects are out-of-focus.

14. The system of claim 11, wherein the memory further includes instructions that, when executed by the one or more processors, cause the image capture device to:
obtain a depth map of a scene captured by the image capture device during the image capture event; and
determine, based at least in part on the depth map, a first object that is in focus at a first focal depth in the scene and one or more objects located at a focal depth in the scene different than the first focal depth.

15. The system of claim 14, wherein the image is generated by at least:
rendering the first object using values from the first set of values and the second set of values that correspond to the first focal depth, and rendering the one or more objects other than the first object to be out-of-focus.

16. The system of claim 11, wherein the change in the focus is performed smoothly in a continuous transition from the first focus setting to the second focus setting.

17. The system of claim 11, wherein the first aperture and the second aperture are formed by different states of a changeable aperture.

18. The system of claim 17, wherein the changeable aperture is configured to alternate between a first aperture state and a second aperture state by a mechanical method.

19. The system of claim 17, wherein the changeable aperture is configured to alternate between a first aperture state and a second aperture state by an electrical method.

20. A non-transitory computer-readable storage medium having collectively stored thereon executable instructions that, as a result of execution by one or more processors of an electronic device comprising a sensor array, cause the electronic device to at least:
perform an image capture process during which light passes through a first aperture of a first set of sensors of the sensor array;
during the image capture process, cause a first focus associated with the first aperture to change from the first focus to a second focus of a second aperture of a second set of sensors of the sensor array, a first focal length of the first aperture being different from a second focal length of the second aperture;
obtain, for the image capture process, a first set of image data corresponding to the first aperture and a second set of image data corresponding to the second aperture; and
generate an image using the first set of image data and the second set of image data.

21. The non-transitory computer-readable storage medium of claim 20, the instructions further causing the electronic device to at least:
obtain a third set of image data corresponding to light passing through the second aperture of the second set of sensors of the sensor array, wherein the image is generated based at least in part on the third set of image data.

22. The non-transitory computer-readable storage medium of claim 20, the instructions further causing the electronic device to at least:
generate a depth map of a scene imaged during the image capture process, wherein the image is generated based at least in part on the depth map.

23. The non-transitory computer-readable storage medium of claim 22, wherein the depth map includes information indicating whether objects in the scene are in focus, and the image is generated using image data for objects in focus and image data for objects out of focus.

24. The non-transitory computer-readable storage medium of claim 22, wherein the depth map is generated using information regarding optical characteristics associated with the first aperture or the second aperture.

25. The non-transitory computer-readable storage medium of claim 20, the instructions further causing the electronic device to at least:
 determine first image data, in the first set of image data or the second set of image data, imaging a first set of objects that are in focus in a scene captured during the image capture process; and
 determine second image data, in the first set of image data or the second set of image data, imaging a second set of objects that are out of focus in the scene, wherein the image is generated using the first image data and the second image data.

26. The non-transitory computer-readable storage medium of claim 20, wherein the image is generated by at least processing differences between the first set of image data and the second set of image data.

27. The non-transitory computer-readable storage medium of claim 20, the instructions further causing the electronic device to at least form the first aperture and the second aperture as different states of a changeable aperture.

28. The non-transitory computer-readable storage medium of claim 27, the instructions further causing the changeable aperture to alternate between a first aperture state and a second aperture state by a mechanical method.

29. The non-transitory computer-readable storage medium of claim 27, the instructions further causing the changeable aperture to alternate between a first aperture state and a second aperture state by an electrical method.

* * * * *